(12) United States Patent
Hongo et al.

(10) Patent No.: US 8,278,388 B2
(45) Date of Patent: Oct. 2, 2012

(54) ALICYCLIC EPOXY RESIN COMPOSITION, CURED PRODUCT THEREOF, PRODUCTION METHOD THEREOF, AND RUBBERY POLYMER-CONTAINING RESIN COMPOSITION

(75) Inventors: Shinya Hongo, Takasago (JP); Kazuhiro Yoshida, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 12/864,968

(22) PCT Filed: Jan. 27, 2009

(86) PCT No.: PCT/JP2009/051241
§ 371 (c)(1),
(2), (4) Date: Oct. 6, 2010

(87) PCT Pub. No.: WO2009/096374
PCT Pub. Date: Aug. 6, 2009

(65) Prior Publication Data
US 2011/0015347 A1    Jan. 20, 2011

(30) Foreign Application Priority Data

Jan. 28, 2008  (JP) ................................ 2008-016557
Jan. 22, 2009  (JP) ................................ 2009-011856

(51) Int. Cl.
C08L 33/06     (2006.01)
C08L 51/04     (2006.01)
C08F 265/06    (2006.01)
C08G 59/48     (2006.01)

(52) U.S. Cl. ........................................................ 525/65
(58) Field of Classification Search ................. 523/201; 525/65
See application file for complete search history.

(56) References Cited

U.S. PATENT DOCUMENTS

| | | | |
|---|---|---|---|
| 4,576,850 A * | 3/1986 | Martens | 428/156 |
| 5,290,857 A | 3/1994 | Ashida et al. | |
| 5,962,403 A | 10/1999 | Kohama et al. | |
| 6,638,567 B1 | 10/2003 | Beisele | |
| 6,774,167 B1 * | 8/2004 | Oepen et al. | 524/268 |
| 2004/0039118 A1 * | 2/2004 | Chirgott | 525/67 |
| 2006/0135642 A1 | 6/2006 | Makker et al. | |
| 2006/0194063 A1 | 8/2006 | Murai et al. | |
| 2007/0010618 A1 * | 1/2007 | Chen et al. | 525/65 |
| 2007/0027263 A1 | 2/2007 | Furukawa et al. | |
| 2007/0251419 A1 | 11/2007 | Yamaguchi et al. | |
| 2009/0270557 A1 | 10/2009 | Tomita et al. | |

FOREIGN PATENT DOCUMENTS

| | | |
|---|---|---|
| JP | 5-65391 | 3/1993 |
| JP | 5-295237 | 11/1993 |
| JP | 9-48992 | 2/1997 |
| JP | 2751071 | 2/1998 |
| JP | 2002-539313 | 11/2002 |
| JP | 2005-120357 | 5/2005 |
| JP | 2007-131772 | 5/2007 |
| JP | 2007-138056 | 6/2007 |
| WO | 2005/028546 | 3/2005 |
| WO | 2006/019041 | 2/2006 |
| WO | 2006/060179 | 6/2006 |

OTHER PUBLICATIONS

International Search Report issued Apr. 21, 2009 in International (PCT) Application No. PCT/JP2009/051241.
Chinese Office Action issued Jan. 12, 2012 in corresponding Chinese Application No. 200980103381.3, with English translation.

* cited by examiner

*Primary Examiner* — Jeffrey Mullis
(74) *Attorney, Agent, or Firm* — Wenderoth, Lind & Ponack, L.L.P.

(57) ABSTRACT

It is an object of the invention to provide a rubbery polymer-containing resin composition useful as a raw material for a molded article and a cured product having high transparency and excellent mechanical strength: namely, an object of the invention is to provide, for example, a cycloaliphatic epoxy resin composition capable of improving the toughness thereof while maintaining the mechanical strength and transparency of the cycloaliphatic epoxy resin without lowering the heat resistance, a production method thereof and a cured product thereof. A rubbery polymer-containing resin composition of the invention, for example, a cycloaliphatic epoxy resin composition of the invention is a cycloaliphatic epoxy resin composition comprising 100 parts by weight of a cycloaliphatic epoxy resin and 1 to 60 parts by weight of polymer particles with a volume average particle diameter (Mv) of not smaller than 0.01 μm and not larger than 0.5 μm, characterized in that each of the polymer particles comprises at least two layers of an elastic core layer present in the inside thereof and a shell layer present in the outermost side thereof, the elastic core layer consisting of a rubbery polymer with a glass transition temperature of lower than 10° C., and the composition is colorless and transparent.

8 Claims, No Drawings

ALICYCLIC EPOXY RESIN COMPOSITION, CURED PRODUCT THEREOF, PRODUCTION METHOD THEREOF, AND RUBBERY POLYMER-CONTAINING RESIN COMPOSITION

TECHNICAL FIELD

The invention relates to a rubbery polymer-containing resin composition useful as a raw material for a molded article or a cured product having high transparency and excellent mechanical strength.

BACKGROUND ART

A thermosetting resin represented by epoxy resins, unsaturated polyester resins, polyimides, and phenol resins is excellent in heat resistance, mechanical strength, or size precision and has been used widely in various fields. For example, since being excellent in mechanical strength, chemical resistance, heat resistance, adhesiveness, and electric properties, a cured product of an epoxy resin has been used widely for products required to have strength such as parts of automobiles and railroad vehicles and electric parts. Particularly, in the case such an epoxy resin cured product is used for applications such as sealing materials for optical semiconductor devices represented by light-emitting devices such as electroluminescent diodes (LED), light-receiving devices such as photodiodes, and photoelectric conversion devices such as CCD; adhesives for optical parts; and transparent coating materials, the cured product is required to be colorless and transparent and excellent in light stability in addition to the above mentioned properties.

To solve the above mentioned problems, an example disclosed is a cycloaliphatic epoxy resin which is a hydrogenated epoxy resin obtained by hydrogenating benzene nuclei of an aromatic epoxy resin with a high molecular weight, having a high hydrogenation ratio, excellent in transparency, and being solid at normal temperature (e.g., reference to Patent Document 1). However, although being excellent in transparency and light stability, this epoxy resin cured product cannot be said to be sufficient particularly as a sealing material for optical semiconductor devices and is required to have further higher resistance to cracking (toughness) in addition to high strength and high transparency.

That is, since an epoxy resin itself is insufficient in the ability of moderating heat impact stress under environments in which cooling and heating are repeated, the epoxy resin has a problem that cracks are easily caused and long term reliability is inferior if the epoxy resin is used for the above mentioned applications.

On the other hand, as one of means for improving toughness of an epoxy resin cured product, a rubber component has been conventionally compounded with an epoxy resin. Especially, employing a polymerization method in a water medium represented by emulsion polymerization, dispersion polymerization, and suspension polymerization, methods of compounding rubbery polymer particles prepared previously to be particulate are disclosed (e.g., reference to Patent Documents 2 and 3). However, so far, it has not been made possible to obtain a cured product with improved toughness while keeping transparency by compounding a rubber component with an epoxy resin.

Resin compositions for obtaining molded articles and cured products having high transparency and excellent in mechanical properties have been strongly demanded in fields relevant to building components/housing materials and electric/electronic parts and various resins have been required to have higher performance.

For example, a method of adding a diene type rubber-containing graft copolymer is employed in order to improve impact resistance of a vinyl chloride resin which is a thermoplastic resin, and a method of adding an acrylic acid ester type rubber-containing graft copolymer is employed in order to further improve weathering resistance thereof and in that case, in order to keep the excellent transparency of the vinyl chloride resin, it is common for the methods to employ a rubber component obtained by copolymerizing styrene for conforming the refractive indexes of these graft copolymers, particularly the refractive index of rubber as their main components with the refractive index (n: about 1.54) of vinyl chloride which is a matrix resin.

For these methods, it is common to employ a method of using a copolymer containing, as a main component, a monomer of which a homopolymer has a glass transition temperature (Tg) of 0° C. or lower and a refractive index (n) of 1.5 or lower, for example, butadiene (Tg=−85° C., n=1.47), butyl acrylate (Tg=−54° C., n=1.47), 2-ethylhexyl acrylate (Tg=−50° C., n=1.46), etc., and as a sub-component of which a homopolymer has a glass transition temperature (Tg) exceeding 0° C. and a refractive index (n) exceeding 1.5, for example, styrene (Tg=100° C., n=1.60).

For example, Patent Document 4 discloses a transparent thermoplastic resin composition in which core-shell type multilayer structure particles having a rubber phase with a glass transition temperature of 0° C. or lower are dispersed, characterized in that the difference of the refractive index of the rubber phase and the refractive index of a resin phase at 23° C. is within a specified range when they are measured separately and that the difference of the temperature-relevant fluctuation of the refractive index of the rubber phase and the temperature-relevant fluctuation of the refractive index of the resin phase at 23 to 70° C. is within a specified range when they are measured separately, as a method for providing a transparent thermoplastic resin composition maintaining impact resistance and mold processability which are exhibited by conventional rubber-modified transparent thermoplastic resin and having improved defects such as increase of haze and decrease of transparency due to heating. For example, the rubber layer of Example 5 in Patent Document 1 is a copolymer of 54 parts by weight of 2-ethylhexyl acrylate having the above mentioned properties and 13.6 parts by weight of benzyl methacrylate (Tg=54° C., n=1.57).

However, in the case of using a rubbery polymer which is a copolymer containing, as a sub-component, a monomer of which a homopolymer has a Tg exceeding 0° C., although it is possible to adjust the refractive index to a certain extent, the elasticity of the rubber itself is decreased and it results in failure of causing a sufficient impact improvement effect in some cases.

Patent document 1: Japanese Patent Laid-open Publication No. 2005-120357
Patent document 2: Japanese Patent Laid-open Publication No. 5-295237
Patent document 3: Japanese Patent No. 2751071
Patent document 4: Japanese Patent Laid-open Publication No. 9-048922

DISCLOSURE OF THE PRESENT INVENTION

Problems that the Present Invention is to Solve

In view of such situation, it is an object of the invention to provide a rubbery polymer-containing resin composition useful as a raw material for a molded article and a cured product having high transparency and excellent mechanical strength: namely, an object of the invention is to provide, for example, a cycloaliphatic epoxy resin composition capable of improving the toughness thereof while maintaining the mechanical strength and transparency of the cycloaliphatic epoxy resin, and a transparent cured product obtained by curing the resin composition, and the invention relates to a cycloaliphatic epoxy resin composition containing polymer particles, more particularly core-shell polymer particles dispersed therein; a cured product thereof; and a production method thereof.

Means for Solving the Problems

The inventors have made intense studies, thus have found that use of polymer particles having a core-shell structure of a specified configuration can make a cured product of a cycloaliphatic epoxy resin composition compounding the particles transparent and can provide the cured product with high strength and high toughness, and have completed the invention.

At the same time, the inventors also have found a production method of a cycloaliphatic epoxy resin composition of the invention by stably dispersing the polymer particles of the invention in a primary particle state in a cycloaliphatic epoxy resin by a prescribed manner. Curing of this cycloaliphatic epoxy resin composition of the invention gives a cured product excellent and uniform in overall transparency and strength.

Additionally, "dispersing polymer particles (being dispersed) in a primary particle state" in this specification means that respective polymer particles which are particles having a volume average particle diameter of 0.01 μm to 0.5 μM are dispersed independently in a cycloaliphatic epoxy resin composition without being agglomerated one another.

That is, the cycloaliphatic epoxy resin composition of the invention is a cycloaliphatic epoxy resin composition comprising 100 parts by weight of a cycloaliphatic epoxy resin and 1 to 60 parts by weight of polymer particles with a volume average particle diameter (Mv) of not smaller than 0.01 μm and not larger than 0.5 μm, characterized in that each of the polymer particles comprises at least two layers of an elastic core layer present in the inside thereof and a shell layer present in the outermost side thereof, the elastic core layer consisting of a rubbery polymer with a glass transition temperature of lower than 10° C., and the composition is colorless and transparent.

A preferable embodiment is the cycloaliphatic epoxy resin composition in which the polymer particles are obtained by polymerizing 20% to 97% by mass of a (meth)acrylic acid ester having at least one aromatic ring in the molecule thereof, 2% to 10% by mass of a (meth)acrylic acid ester having at least one cyclic ether structure in the molecule thereof, 1% to 6% by mass of a polyfunctional monomer, 0% to 77% by mass of another (meth)acrylic acid ester, and 0% to 27% by mass of another vinyl monomer, in an amount of 100% by mass in total.

Another preferable embodiment is the cycloaliphatic epoxy resin composition in which the rubbery polymer is obtained by polymerizing 20% to 99% by mass of a (meth) acrylic acid ester having at least one aromatic ring in the molecule thereof, 1% to 6% by mass of a polyfunctional monomer, 0% to 79% by mass of another (meth)acrylic acid ester, and 0% to 29% by mass of another vinyl monomer, in an amount of 100% by mass in total.

Another preferable embodiment is the cycloaliphatic epoxy resin composition in which the shell layer in the outermost layer is obtained by polymerizing 0% to 43% by mass of a (meth)acrylic acid ester having at least one aromatic ring in the molecule thereof, 15% to 58% by mass of a (meth) acrylic acid ester having at least one cyclic ether structure in the molecule thereof, 2% to 15% by mass of a polyfunctional monomer, 0% to 83% by mass of another (meth)acrylic acid ester, and 0% to 43% by mass of another vinyl monomer, in an amount of 100% by mass in total.

Another preferable embodiment is the cycloaliphatic epoxy resin composition in which the polymer particles are dispersed in state of primary particles in the cycloaliphatic epoxy resin.

Further, the invention relates to a cured product obtained by curing the cycloaliphatic epoxy resin of the invention, characterized in that the cured product with a thickness of 3 mm has an optical transmittance of 80% or higher in a wavelength range of 380 to 800 nm.

A preferable embodiment is the cured product obtained by curing with an acid anhydride curing agent or a cationic polymerization initiator.

Moreover, the invention relates to a process for producing a cycloaliphatic epoxy resin composition of the invention including successively a first step of mixing a water-based latex containing polymer particles with an organic solvent with a solubility of not lower than 5% by mass and not higher than 40% by mass in water at 20° C., and then further mixing with an excessive amount of water to agglomerate the polymer particles; a second step of separating and recovering the agglomerated polymer particles from the liquid phase, and then mixing the polymer particles with an organic solvent again to obtain an organic liquid containing the polymer particles; and a third step of further mixing the organic liquid with a cycloaliphatic epoxy resin, and then removing the organic solvent thereof, and since the cycloaliphatic epoxy resin composition of the invention produced by such a production method contains the polymer particles dispersed in state of primary particles in the cycloaliphatic epoxy resin, the cycloaliphatic epoxy resin composition is excellent in handling property and reproducibility of physical properties and contains little remaining amount of foreign matter such as an emulsifier or electrolytic substances derived from the synthesis of the polymer particles, and thus the cycloaliphatic epoxy resin composition is low hygroscopicity and excellent in electric properties.

A preferable embodiment is the process for producing the cycloaliphatic epoxy resin composition, wherein an operation of separating and recovering the agglomerated polymer particles from the liquid phase, mixing them with an organic solvent with a solubility of not lower than 5% by mass and not higher than 40% by mass in water at 20° C., and then further mixing with an excessive amount of water to agglomerate the polymer particles between the first step and the second step.

Furthermore, the inventors have made intense studies, thus have found that use of a rubbery polymer having a specified configuration can make a molded article or a cured product of a resin composition containing the polymer have high transparency and excellent mechanical strength, and have completed the invention.

That is, the rubbery polymer-containing resin composition of the invention is a rubbery polymer-containing resin composition containing a rubbery polymer with a glass transition temperature of 0° C. or lower, characterized in that the rubbery polymer is a rubbery polymer obtained by polymerizing rubbery polymer-constituting components consisting of 20% to 100% by weight of a (meth)acrylic acid ester having a phenoxy group, 0% to 80% by weight of an alkyl acrylic acid ester having an alkyl group of 2 to 18 carbon atoms, and 0% to 30% by weight of a monomer copolymerizable with these esters.

A preferable embodiment is that the rubbery polymer is a crosslinked rubbery polymer obtained by polymerizing rubbery polymer-constituting components consisting of 20% to 99.95% by weight of a (meth)acrylic acid ester having a phenoxy group, 0% to 79.95% by weight of an alkyl acrylic acid ester having an alkyl group of 2 to 18 carbon atoms, 0.05% to 10% by weight of a polyfunctional monomer, and 0% to 20% by weight of a monomer copolymerizable with these esters and this monomer.

Another preferable embodiment is that the rubbery polymer-containing resin composition is a rubbery polymer-containing resin composition which contains a core-shell polymer composition obtained by forming a hard polymer having a glass transition temperature of higher than 0° C., which hard polymer is obtained by polymerizing 5 to 100 parts by weight of hard polymer-constituting components in the presence of 100 parts by weight of the rubbery polymer.

Another preferable embodiment is that the rubbery polymer-containing resin composition is a rubbery polymer-containing resin composition, which further contains at least one resin (A) selected from the group consisting of thermoplastic resins, thermosetting resins, and elastomer resins.

A preferable embodiment is that the resin (A) is at least one thermoplastic resin selected from the group consisting of vinyl chloride based resins, acrylic based resins, and styrene based resins.

Effects of the Invention

Since containing the rubbery polymer with a specified configuration, the rubbery polymer-containing resin composition of the invention is a rubbery polymer-containing resin composition useful as a raw material of a molded article or a cured product having high transparency and excellent mechanical strength and, for example, since compounded with polymer particles having a core-shell structure of a specified configuration, a cycloaliphatic epoxy resin composition which is a representative composition of the invention becomes a cycloaliphatic epoxy resin composition provided with improved toughness while keeping mechanical strength and transparency of the cycloaliphatic epoxy resin without lowering the heat resistance.

BEST MODE FOR CARRYING OUT THE INVENTION (Rubbery Polymer-Containing Resin Composition)

A rubbery polymer-containing resin composition of the invention is a rubbery polymer-containing resin composition containing a rubbery polymer having a glass transition temperature of lower than 10° C., preferably 0° C. or lower, and preferably the rubbery polymer is a rubbery polymer obtained by polymerizing rubbery polymer-constituting components consisting of 20% to 100% by weight of a (meth)acrylic acid ester having a phenoxy group, 0% to 80% by weight of an alkyl acrylic acid ester having an alkyl group of 2 to 18 carbon atoms, and 0% to 30% by weight of a monomer copolymerizable with these esters, so that a molded article and a cured product thereof have high transparency and excellent mechanical strength.

It is preferable to make the rubbery polymer be a crosslinked rubber by using, as the rubbery polymer-constituting components, a rubbery polymer-constituting components consisting of 20% to 99.95% by weight of a (meth) acrylic acid ester having a phenoxy group, 0% to 79.95% by weight of an alkyl acrylic acid ester having an alkyl group of 2 to 18 carbon atoms, 0.05% to 10% by weight of a polyfunctional monomer, and 0% to 20% by weight of a monomer copolymerizable with these esters and this monomer, and accordingly, the rubbery polymer can exist in form of particles in a matrix resin without being dissolved therein and thus the mechanical property improvement effect such as an impact resistance improvement effect which is exhibited by the rubbery polymer can be maintained even in form of a molded article or a cured product.

From a viewpoint that the rubbery polymer is maintained in form of particles in a matrix resin, the rubbery polymer-containing resin composition particularly preferably contains a core-shell polymer composition obtained by forming a hard polymer with a glass transition temperature of higher than 0° C. by polymerizing 5 to 100 parts by weight of hard polymer-constituting components in the presence of 100 parts by weight of the rubbery polymer, and such the core-shell polymer can be obtained in form of a particulate powder with a relatively small particle diameter, namely, a volume average particle diameter (Mv) of not smaller than 0.01 μm and not larger than 0.5 μm, which is preferable since the impact resistance improvement effect is significant as polymer particles.

In general, the portion of the rubbery polymer present in the inside of such polymer particles may be called as an elastic core layer and the portion made of the hard polymer and forming the boundaries of the matrix resin and the polymer particles and contributing to the compatibility with the matrix resin, that is, the portion present in the outermost side of the polymer particles may be called as a shell layer in some cases. The polymer particles of the core-shell polymer composition of the invention are preferable to have such a multilayer structure composed of at least two layers.

A resin composition obtained by adding the rubbery polymer-containing resin composition of the invention to at least one kind resin (A) selected from the group consisting of thermoplastic resins, thermosetting resins, and elastomer resins is also a rubbery polymer-containing resin composition of the invention, it is preferable to employ a method described below in which the specified rubbery polymer which is a characteristic of the invention is evenly and uniformly dispersed in such a resin composition, a molded article and a cured product thereof, and a use method of further adding the resin composition as a master batch to a resin is also included as a preferable embodiment.

(Cycloaliphatic Epoxy Resin Composition)

Since the cycloaliphatic epoxy resin composition of the invention contains 100 parts by weight of a cycloaliphatic epoxy resin and 1 to 60 parts by weight of polymer particles which have the following characteristics, a cured product of the resin composition is excellent not only in the toughness but also in the transparency. That is, the polymer particles of the invention have a volume average particle diameter (Mv) of not smaller than 0.01 μm and not larger than 0.5 μm and a multilayer structure composed of at least two layers of namely an elastic core layer present in the inside of the particles and a shell layer present in the outermost layer thereof, and are characterized in that the elastic core layer is composed of a rubbery polymer with a glass transition temperature lower than 10° C., so that a cure product of the resin composition can satisfy both transparency and low stress without lowering the heat resistance intrinsically exhibited by the cycloaliphatic epoxy resin.

"Colorless and transparent" in this specification means that, with respect to the resin composition, particularly a curable resin composition, a cured product thereof, or a molded article obtained by using the rubbery polymer-containing resin composition of the invention as a raw material, a sample of the composition, molded article or cured product with a thickness of 3 mm has an optical transmittance of 80% or higher in a wavelength range of 380 to 800 nm, and more concretely, it means that each sample has the optical transmittance of 80% or higher for all three wavelength values of 380, 540, and 700 nm as representative values.

The cycloaliphatic epoxy resin composition and the rubbery polymer-containing resin composition of the invention may properly be compounded with an antioxidant, an ultraviolet absorbent, an inorganic filler, a dye, a pigment, a diluent, a coupling agent, other resins, a lubricant, a plasticizer, a stabilizer, a filler, or the like to such an extent that the transparency of a molded article or a cured product is not deteriorated.

The cycloaliphatic epoxy resin composition of the invention is preferably prepared by steps including a first step of mixing a water-based latex containing polymer particles, e.g., a reaction mixture after production of polymer particles by emulsion polymerization, with an organic solvent with a solubility of not lower than 5% by mass and not higher than 40% by mass in water at 20° C. and then t further mixing with an excessive amount of water to moderately agglomerate the polymer particles to obtain a moderate polymer particle agglomerate; a second step of separating and recovering the moderate polymer particle agglomerate from the liquid phase, and then mixing the polymer particles with an organic solvent for dispersion again to obtain a polymer particle dispersion containing the polymer particles dispersed in the organic solvent for dispersion; and a third step of further mixing the polymer particle dispersion with a cycloaliphatic epoxy resin and then distilling off the organic solvent for dispersion. Since the cycloaliphatic epoxy resin composition containing the polymer particles dispersed in state of primary particles (hereinafter, referred to also as primary dispersion) can be easily obtained by the above-mentioned method, the cycloaliphatic epoxy resin composition of the invention or a cycloaliphatic epoxy resin composition obtained by further adding the composition to a cycloaliphatic epoxy resin, that is, a resin composition obtained by adding the cycloaliphatic epoxy resin composition of the invention to a cycloaliphatic epoxy resin composition as so-called master batch, is excellent in handling property and their cured products are excellent in reproducibility of the physical properties and evenness.

"Being primarily dispersed" in this specification means that the particle dispersibility described below is 90% or higher.

In the production method of the cycloaliphatic epoxy resin composition of the invention, since the remaining amounts of foreign substances such as an emulsifier and electrolytic substances derived from the synthesis of polymer particles can be lessened, the cycloaliphatic epoxy resin composition to be obtained is provided with low hygroscopicity and excellent electric characteristics and is thus preferably usable for applications such as sealing/insulating materials for electric/electronic parts, adhesives for optical parts, and transparent coating materials. The preparation method of the cycloaliphatic epoxy resin composition of the invention will be described in more detail in the following "(Preparation method of cycloaliphatic epoxy resin composition)".

Further, hereinafter, the cycloaliphatic epoxy resin composition of the invention will be described separately in detail.

(Cycloaliphatic Epoxy Resin)

The cycloaliphatic epoxy resin used in the invention may be conventionally known hydrogenated epoxy resins or conventionally known cycloaliphatic epoxy resins obtained by epoxidation of a cyclic unsaturated bond. Examples of the cycloaliphatic epoxy resin used in the invention include hydrogenated bisphenol A type epoxy resins, hydrogenated bisphenol F type epoxy resins, hexahydrophthalic acid glycidyl ester, conventionally known hydrogenated epoxy resins disclosed in, for example, Japanese Patent Laid-open Publication No. 2007-131772, or conventionally known cycloaliphatic epoxy resins such as 3,4-epoxycyclohexylmethyl-3',4'-epoxycyclohexane carboxylate, 1,2-epoxy-4-vinylcyclohexane, 3,4-epoxycyclohexylmethyl(meth)acrylate, 1-epoxyethyl-3,4-epoxycyclohexane, 3,4-epoxycyclohexyl methanol, bis(3,4-epoxycyclohexylmethyl)adipate, limonene diepoxide, dicyclopentadiene diepoxide. These cycloaliphatic epoxy resins may be used alone or as a combination of two or more.

Among the cycloaliphatic epoxy resins, in view of handling property and physical property of a cured product, hydrogenated bisphenol A type epoxy resins, hydrogenated bisphenol F type epoxy resins, and 3,4-epoxycyclohexylmethyl-3',4'-epoxycyclohexane carboxylate are particularly preferred.

(Polymer Particle)

To make a cured product of the cycloaliphatic epoxy resin composition of the invention more transparent, it is preferable that the resin composition is a cycloaliphatic epoxy resin composition containing the polymer particles formed by polymerizing monomers for producing a polymer particle consisting of 20% to 97% by mass of a (meth)acrylic acid ester having at least one aromatic ring in the molecule thereof, 2% to 10% by mass of a (meth)acrylic acid ester having at least one cyclic ether structure in the molecule thereof, 1% to 6% by mass of a polyfunctional monomer, 50% to 77% by mass of another (meth)acrylic acid, and 0% to 27% by mass of another vinyl monomer, in an amount of 100% by mass in total. Such polymer particles can lead to polymer particles with an average refractive index n close to the refractive index $n_E$ of a cured product of the cycloaliphatic epoxy resin, for example, in a range of $n=n_E \pm 0.01$. The monomers for polymer particle production include monomers for producing a rubbery polymer and monomers for producing a shell layer polymer.

The shell layer of the invention has an elastic core layer/shell layer ratio with respect to the elastic core layer (mass ratio of the respective monomers for producing a polymer) preferably in a range of 40/60 to 95/5, more preferably 50/50 to 90/10, and even more preferably 60/40 to 88/12. If the ratio of the elastic core layer is lowered out of 40/60 of the elastic core layer/shell layer ratio, the toughness improvement effect for a cured product of the cycloaliphatic epoxy resin composition tends to be decreased. On the other hand, if the ratio of the shell layer is lowered out of 95/5, agglomeration tends to occur at the time of handling the polymer particles and the handing property tends to be a problem in some cases. Moreover, it may be impossible to obtain desired physical properties for a cured product of the cycloaliphatic epoxy resin composition.

In this specification, a (meth)acrylic acid ester means an acrylic acid ester and/or a methacrylic acid ester.

((Meth)Acrylic Acid Ester Having at Least One Aromatic Ring in the Molecule Thereof)

The polymer particles of the invention are formed by polymerizing monomers for producing a polymer particle containing preferably 20% to 97% by mass of a (meth)acrylic acid ester having at least one aromatic ring in the molecule thereof, more preferably 20% to 90% by mass, and even more preferably 20% to 80% by mass.

The (meth)acrylic acid ester having at least one aromatic ring in the molecule thereof, that is, aromatic ring containing (meth)acrylates may be phenoxyethyl(meth)acrylate, phenoxymethyl(meth)acrylate, benzyl(meth)acrylate and the like. Among them, in view of a low glass transition temperature (hereinafter also referred to as "Tg") of a polymer thereof, phenoxyethylacrylate (Tg=−22° C.), benzylacrylate (Tg=6° C.) are preferred, phenoxyethylacrylate is particularly preferred. Since these aromatic ring containing (meth) acrylates have a high refractive index caused by a benzene ring, it is easy to conform the refractive index of a polymer obtained from a monomer including this ester with the refractive index of the cycloaliphatic epoxy resin as a matrix resin of the invention. That is, phenoxyethylacrylate and benzylacrylate are monomers having characteristics respectively of a low Tg and a high refractive index, unlike styrene having a high Tg and a high refractive index.

((Meth)Acrylic Acid Ester Having at Least One Cyclic Ether Structure in the Molecule Thereof)

The polymer particles of the invention are formed by polymerizing monomers for producing a polymer particle containing preferably 2% to 10% by mass of a (meth)acrylic acid ester having at least one cyclic ether structure in the molecule thereof, more preferably 3% to 9% by mass, and even more preferably 4% to 8% by mass.

The (meth)acrylic acid ester having at least one cyclic ether structure in the molecule thereof, that is, cyclic ether structure containing (meth)acrylates may be glycidyl(meth)acrylate, glycidylalkyl(meth)acrylate, 3,4-epoxycyclohexylmethyl (meth)acrylate, 3-ethyl-3-oxetanylmethyl(meth)acrylate and the like. Among them, glycidylmethacrylate, 3,4-epoxycyclohexylmethylmethacrylate, and 3-ethyl-3-oxetanylmethylmethacrylate are preferred. In view of the dispersion stability in a cured product, glycidylmethacrylate and 3-ethyl-3-oxetanylmethylmethacrylate are particularly preferred.

(Elastic Core Layer)

The elastic core layer or the rubbery polymer of the invention is composed of a polymer having a characteristic as a rubber capable of providing a molded article and a cured product of the rubbery polymer-containing resin composition of the invention and a cured product of the cycloaliphatic epoxy resin composition with excellent mechanical strength such as toughness, and the polymer can also provide a transparency thereto. Further, the elastic core layer often has a monolayer structure; however it may have a multilayer structure. In the case the elastic core layer has a multilayer structure, the polymer compositions for the respective layers may be different from one another.

Having a characteristic as a rubber, the elastic core layer polymer or the rubbery polymer is required to have a Tg less than 10° C., preferably of 0° C. or lower (e.g., −100° C. to 0° C.), and more preferably of −40° C. or lower (e.g., −100° C. to −40° C.).

The rubbery polymer is preferably a polymer obtained by polymerizing monomers for producing a rubbery polymer containing 20% to 99% by mass of a (meth)acrylic acid ester having at least one aromatic ring in the molecule thereof, 1% to 6% by mass of a polyfunctional monomer, 0% to 79% by mass of another (meth)acrylic acid ester, and 0% to 29% by mass of another vinyl monomer, in an amount of 100% by mass in total and such polymerization makes it possible to make the refractive index $n_C$ of the elastic core layer close to the refractive index $n_E$ of a cured product of the cycloaliphatic epoxy resin and, for example, to make $n_C$ be in a range of $n=n_E\pm0.01$.

As described above, the rubbery polymer is preferably a rubbery polymer having a glass transition temperature of 0° C. or lower and obtained by polymerizing a rubbery polymer-constituting components consisting of 20% to 100% by weight of a (meth)acrylic acid ester having a phenoxy group, 0% to 80% by weight of an alkyl acrylic acid ester having an alkyl group of 2 to 18 carbon atoms, and 0% to 30% by weight of a monomer copolymerizable with these esters, and since the rubbery polymer obtained by polymerization in such a manner is a homopolymer, n is high; however the rubbery polymer contains no sub-component such as styrene with a high Tg and the monomers with a relatively high n of homopolymer thereof can serve as rubber components and therefore it is easy to make n of the rubbery polymer close to n of the matrix resin and it is made possible to provide a molded article and a cured product of the resin composition containing the rubbery polymer with high transparency and excellent mechanical strength.

Further, the rubber to be used as the elastic core layer may include a diene type rubber obtained by polymerization of mainly a conjugated diene type monomer depending on the types of a main monomer among the above-mentioned monomers for producing a rubbery polymer, that is, a monomer to be the first monomer; an acrylic rubber obtained by polymerization of mainly a (meth)acrylic acid ester type monomer; and a polysiloxane rubber; a combination thereof and a composite thereof can be used, and an acrylic rubber is preferable used in terms of the transparency and light stability of the cured product.

In terms of retention of dispersion stability of polymer fine particles used in the invention in the cycloaliphatic epoxy resin composition and also in terms of retention of dispersion stability of the rubbery polymer used in the invention in the matrix resin composition, it is preferable for the elastic core layer or rubbery polymer to have a crosslink structure in the polymer components obtained by polymerization of the above-mentioned monomers. A method for introducing the crosslink structure is not particularly limited and means commonly used can be adopted. For example, a method for introducing the crosslink structure in the polymer components obtained by polymerization of the above-mentioned monomers may be a method of adding a crosslinkable monomer such as a polyfunctional monomer described below to the polymer component and then polymerizing it. Concretely, the elastic core layer has a gel content of preferably 60% by mass or higher, more preferably 80% by mass or higher, furthermore preferably 90% by mass or higher, and even more preferably 95% by mass or higher. The gel content in this specification means a ratio of an insoluble matter to the total of the insoluble matter and a soluble matter in the case 0.5 g of crumb obtained by coagulation and drying is immersed in 100 g of toluene and left still at 23° C. for 24 hours and then separated into the insoluble mater and the soluble matter.

(Rubbery Polymer-Constituting Component)

As described above, the rubbery polymer-constituting components or the monomers for producing a rubbery polymer contain a (meth)acrylic acid ester having at least one aromatic ring in the molecule thereof, preferably a (meth) acrylic acid ester having a phenoxy group in the molecule, in an amount of preferably 20% to 100% by weight, more preferably 20% to 99.95% by weight, furthermore preferably 20% to 99% by weight, even more preferably 20% to 90% by weight, and even more particularly preferably 20 to 80% by weight.

With respect to the (meth)acrylic acid ester having at least one aromatic ring in the molecule thereof, that is, aromatic ring-containing (meth)acrylates, as explained in the paragraph ((Meth)acrylic acid ester having at least one aromatic ring in the molecule thereof), phenoxyethyl acrylate and benzyl acrylate with a particularly low Tg are monomers suitable for obtaining the rubbery polymer providing the elastic core layer of the invention with the elasticity and therefore, the contents thereof in the monomers for producing a rubbery polymer are preferable to be higher than those in the monomers for producing a shell layer polymer.

With respect to the above-mentioned (meth)acrylic acid ester having a phenoxy group, that is, phenoxy group-containing (meth)acrylic acid esters, it will be described in the following paragraph ((meth)acrylic acid ester having a phenoxy group), and a phenoxyethyl acrylic acid ester with a particularly low Tg is preferable and is a monomer suitable for providing the rubbery polymer of the invention with elasticity and therefore, the content in the rubbery polymer-constituting components is preferably higher than that in the hard polymer-constituting components, which are the monomers for constituting the hard polymer.

In the Patent Document 1, a benzyl (meth)acrylic acid ester is used as a component equivalent to the rubbery polymer-constituting components of the invention. The benzyl methacrylate is also included in (meth)acrylic acid esters having an aromatic ring similarly to the phenoxy group-containing (meth)acrylic acid ester of the invention, and the benzyl (meth)acrylic acid ester slightly causes an effect, which is the above-mentioned effect of the invention, to provide a molded article and a cured product of the resin composition containing the rubbery polymer with high transparency and excellent mechanical strength. The reason for that is supposedly because the aromatic ring is directly bonded by the ether bond in the phenoxy group-containing (meth)acrylic acid ester of the invention and thus it is easy to provide polymers with elasticity whereas the aromatic ring is not directly bonded by ether bond in the benzyl (meth)acrylic acid ester.

As described above, the monomers for producing a rubbery polymer or the rubbery polymer-constituting components contain preferably 0.05% to 10% by weight of a polyfunctional monomer, more preferably 1% to 6% by weight of a polyfunctional monomer, furthermore preferably 1% to 5% by weight, and even more preferably 2% to 5% by weight, is effective to introduce the crosslink structure into the rubbery polymer of the invention, and thus contribute to the retention of the dispersion stability of the rubbery polymer in the cycloaliphatic epoxy resin composition or a rubbery polymer-containing resin composition of the invention.

The above-mentioned polyfunctional monomer has been already described in the paragraph (Polyfunctional monomer) and as described above, since the monomer is effective to introduce the crosslink structure into the elastic core layer of the invention and thus contributes to the retention of the dispersion stability of the polymer fine particles in the cycloaliphatic epoxy resin composition of the invention.

As described above, the monomers for producing a rubbery polymer contain preferably 0% to 79% by mass of another (meth)acrylic acid ester, more preferably 10% to 70% by mass, and even more preferably 20% to 70% by mass.

The other (meth)acrylic acid ester type monomer has been already described in the paragraph (Another (meth)acrylic acid ester) and is a component constituting the first monomer together with the (meth)acrylic acid ester having at least one aromatic ring in the molecule thereof.

As described above, the monomers for producing a rubbery polymer contain preferably 0% to 29% by mass of another vinyl monomer and more preferably 0% to 20% by mass. That is, the polymer constituting the elastic core layer of the invention may be a copolymer containing the first monomer and another vinyl monomer which is a second monomer.

Another vinyl monomer has been already described in the paragraph (Another vinyl monomer).

As described above, the rubbery polymer-constituting components are required to contain 0% to 80% by weight of an alkyl acrylic acid ester having an alkyl group of 2 to 18 carbon atoms, preferably 10% to 70% by weight, and more preferably 20% to 70% by weight. The alkyl acrylic acid ester having an alkyl group of 2 to 18 carbon atoms will be described in more detail in the following paragraph (Alkyl acrylic acid ester having an alkyl group of 2 to 18 carbon atoms).

As described above, the rubbery polymer-constituting components are required to contain 0% to 30% by weight of a monomer copolymerizable with these ester and/or this monomer, but the monomer is an arbitrary component as being apparent from that the content thereof includes 0% by weight, and is not particularly limited as long as it is a monomer copolymerizable with the phenoxy group-containing (meth)acrylic acid ester and the alkyl acrylic acid ester having an alkyl group of 2 to 18 carbon atoms, and is generally a vinyl monomer. Such a monomer copolymerizable with these esters may be described in detail in the following paragraph (Monomer copolymerizable with these esters) and may be a monomer including the polyfunctional monomer as described below and in the case the polyfunctional monomer is particularly limited, the monomer does not include the polyfunctional monomer.

In order to conform the refractive index of a rubbery copolymer of the component (B) to retain the transparency of the resin composition in the case the resin (A) is an acrylic resin and has a refractive index as high as 1.52 or higher, a mixture of monomers consisting of 50% to 100% by weight of the phenoxy group-containing (meth)acrylic acid ester, 0% to 30% by weight of the alkyl acrylic acid ester having an alkyl group of 2 to 18 carbon atoms, 0% to 30% by weight of aromatic vinyl, and 0% to 20% by weight of the monomer copolymerizable with these esters may be copolymerized. Specific examples are preferably copolymerization of a mixture containing 50% to 99.5% by weight of 2-phenoxyethyl acrylate, 0% to 50% by weight of n-butyl acrylate, and 0.5% to 2% by weight of allyl methacrylate (in total 100% by weight) and more preferably copolymerization of a mixture containing 70% to 99.5% by weight of 2-phenoxyethyl acrylate, 0% to 30% by weight of n-butyl acrylate, and 0.5% to 2% by weight of allyl methacrylate (in total 100% by weight).

(Phenoxy Group-Containing (Meth)Acrylic Acid Ester)

Examples of the phenoxy-containing (meth)acrylic acid ester include phenoxyethyl (meth)acrylic acid ester and phenoxymethyl (meth)acrylic acid ester, and among them, since being a polymer with a low Tg, phenoxyethyl (meth)acrylic acid ester (Tg=−22° C.) is preferable and since containing a benzene ring, it has a high refractive index and the refractive index of a polymer from monomers including this ester is conformed with the refractive index of the matrix resin. That is, unlike styrene which has a high Tg and a high refractive index, a phenoxyethyl acrylic acid ester is a monomer having a characteristic of a low Tg and a high refractive index.

(Alkyl Acrylic Acid Ester Having an Alkyl Group of 2 to 18 Carbon Atoms)

Examples of the alkyl acrylic acid ester having an alkyl group of 2 to 18 carbon atoms include ethyl acrylic acid ester, propyl acrylic acid ester, butyl acrylic acid ester, 2-ethylhexyl acrylic acid ester, 4-hydroxybutyl acrylic acid ester, octyl acrylic acid ester, dodecyl acrylic acid ester, stearyl acrylic acid ester. In view of the versatility and polymerizability, butyl acrylic acid ester, 2-ethylhexyl acrylic acid ester, and 4-hydroxybutyl acrylic acid ester are preferred, butyl acrylic acid ester, and 2-ethylhexyl acrylic acid ester are more preferred, butyl acrylic acid ester is particularly preferred.

(Monomer Copolymerizable with these Esters)

As described above, the monomer copolymerizable with the above-mentioned monomers is not particularly limited if it is a monomer copolymerizable with the phenoxy group-containing (meth)acrylic acid ester and the alkyl acrylic acid ester having an alkyl group of 2 to 18 carbon atoms and is generally a vinyl monomer containing a polyfunctional monomer. In the case the polyfunctional monomer is particularly defined, the monomer is a monomer which is not any of the phenoxy group-containing (meth)acrylic acid ester, the alkyl acrylic acid ester having an alkyl group of 2 to 18 carbon atoms, and the polyfunctional monomer; namely, a monomer copolymerizable with these esters, and is not particularly limited as long as it is a monomer copolymerizable with the phenoxy group-containing (meth)acrylic acid ester, the alkyl acrylic acid ester having an alkyl group of 2 to 18 carbon atoms, and the polyfunctional monomer and is generally a vinyl monomer.

(Polyfunctional Monomer)

The polymer particles of the invention are obtained by polymerization of monomers for producing a polymer particle containing preferably 1% to 6% by mass of a polyfunctional monomer, more preferably 1% to 5% by mass, and even more preferably 2% to 5% by mass.

The polyfunctional monomer is a monomer having at least two polymerizable unsaturated bonds in the molecule thereof, may be allylalkyl(meth)acrylic acid esters such as allyl(meth)acrylic acid ester or allylalkyl(meth)acrylic acid ester; polyfunctional(meth)acrylic acid esters such as ethyleneglycol di(meth)acrylic acid ester, triethyleneglycoldi(meth)acrylic acid ester, tetraethyleneglycoldi(meth)acrylic acid ester; diallyl phthalate, triallyl cyanurate, triallyl isocyanurate, divinyl benzene and the like, but butadiene is not included. Allylmethacrylic acid ester, triallyl isocyanurate, and divinyl benzene are particularly preferred.

(Another (Meth)Acrylic Acid Ester)

The polymer particles of the invention is obtained by polymerization of monomers for producing a polymer fine particle containing preferably 0% to 77% by mass of another (meth)acrylic acid ester, more preferably 10% to 70% by mass, and even more preferably 20% to 70% by mass.

The other (meth)acrylic acid ester type monomer described above means an (meth)acrylic acid ester type monomer which is not any of the above-mentioned (meth)acrylic acid ester having at least one aromatic ring in the molecule thereof, (meth)acrylic acid ester having at least one cyclic ether structure in the molecule thereof, and polyfunctional monomer. Examples of another (meth)acrylic acid ester type monomer include alkyl(meth)acrylates, hydroxyalkyl(meth)acrylates, alkoxyalkyl(meth)acrylates. These other (meth)acrylic acid ester type monomers may be used alone or as a combination of two or more.

Examples of the alkyl(meth)acrylates include methyl (meth)acrylate, ethyl(meth)acrylate, butyl(meth)acrylate, 2-ethylhexyl(meth)acrylate, octyl(meth)acrylate, dodecyl (meth)acrylate, stearyl(meth)acrylate, behenyl(meth)acrylate.

Examples of the hydroxyalkyl(meth)acrylates include 2-hydroxyethyl(meth)acrylate, 4-hydroxybutyl(meth)acrylate.

Among these other (meth)acrylic acid ester type monomers, in view of the low Tg, butylacrylate, 2-ethylhexylacrylate, and 4-hydroxybutylacrylate are preferred.

(Another Vinyl Monomer)

The polymer particles of the invention is obtained by polymerization of monomers for producing a polymer fine particle containing preferably 0% to 27% by mass of another vinyl monomer, more preferably 0% to 20% by mass, and even more preferably 0% to 10% by mass.

The other vinyl monomer described above means a vinyl monomer which is not any of the above-mentioned (meth)acrylic acid ester having at least one aromatic ring in the molecule thereof, (meth)acrylic acid ester having at least one cyclic ether structure in the molecule thereof, polyfunctional monomer, and another (meth)acrylic acid ester. Examples of the other vinyl monomer include vinyl arenes such as styrene, α-methylstyrene, monochlorostyrene, and dichlorostyrene; vinyl carboxylic acids such as acrylic acid and methacrylic acid; vinyl cyanides such as acrylonitrile and methacrylonitrile; vinyl halides such as vinyl chloride, vinyl bromide, and chloroprene; alkenes such as ethylene, propylene, butylene, and isobutylene. These monomers as another vinyl monomer may be used alone or as combination of two or more.

(Another Monomer Copolymerizable with these Esters and/or this Monomer)

The rubbery polymer-constituting components of the invention may contain preferably 0% to 20% by mass of another monomer copolymerizable with these esters and/or this monomer and more preferably 0% to 10% by mass.

Examples of the other monomer copolymerizable with these esters and/or this monomer include an alkyl(meth) acrylic acid ester which is not any of the alkyl acrylic acid ester having an alkyl group of 2 to 18 carbon atoms, that is alkylmethacrylic acid esters, hydroxyalkylmethacrylic acid esters, alkylacrylic acid esters having an alkyl group of 19 or more carbon atoms, hydroxyalkylacrylic acid esters having an alkyl group of 19 or more carbon atoms, vinylarenes such as styrene, α-methylstyrene, monochlorostyrene, and dichlorostyrene; vinylcarboxylic acid esters such as acrylic acid and methacrylic acid; vinylcyans such as acrylonitrile, and methacrylonitrile; vinyl halides such as vinyl chloride, vinyl bromide, and chloroprene; alkenes such as vinylacetate, ethylene, propylene, butylene, isobutylene. These other monomers may be used alone or as a combination of two or more.

Examples of the alkylmethacrylic acid esters include methylmethacrylic acid ester, ethylmethacrylic acid ester, butylmethacrylic acid ester, 2-ethylhexylmethacrylic acid ester, octylmethacrylic acid ester, dodecylmethacrylic acid ester, stearylmethacrylic acid ester, and behenylmethacrylic acid ester.

Examples of the hydroxyalkylmethacrylic acid esters include 2-hydroxyethylmethacrylic acid ester, and 4-hydroxybutylmethacrylic acid ester.

(Production Method of Polymer Fine Particle)

The polymer fine particle of the invention has preferably so-called core-shell structure consisting of at least two layers, an elastic core layer present in the inside thereof and a shell layer present in the outermost side thereof and may be produced by a conventionally known method, for example, emulsion polymerization, suspension polymerization, micro-suspension polymerization, or the like. In terms of structure control of the polymer fine particle, emulsion polymerization, particularly multi-step emulsion polymerization, is preferable.

The particle diameter of such a polymer fine particle can be set in a range in which a water-based latex thereof can be stably obtained and in terms of, for example, the transparency and toughness of a cured product of the cycloaliphatic epoxy resin composition of the invention and also in terms of industrial productivity, the volume average particle diameter (Mv) is preferably not smaller than 0.01 μM and not larger than 0.5 μm and more preferably not smaller than 0.03 μm and not larger than 0.3 μm. The volume average particle diameter (Mv) of the polymer fine particles can be measured by using Microtrac UPA 150 (manufactured by Nikkiso Co., Ltd.).

Examples of an emulsifier (dispersant) to be used for emulsion polymerization include various acids such as an alkyl- or aryl-sulfonic acid represented by dioctylsulfosuccinic acid and dodecylbenzenesulfonic acid, an alkyl- or aryl-ethersulfonic acid, an alkyl- or aryl-sulfuric acid represented by dodecylsulfunic acid, an alkyl- or aryl-ethersulfuric acid, an alkyl- or aryl-substituent phosphoric acid, an alkyl- or aryl-ether substituent phosphoric acid, a N-alkyl- or N-aryl-sarcosine acid represented by dodecylsarcosine acid, an alkyl- or aryl-carboxylic acid represented by oleic acid or stearic acid, and an alkyl- or aryl-ether carboxylic acid; an anionic emulsifier (dispersant) such as an alkali metal salt or an ammonium salt thereof; a nonionic emulsifier (dispersant) such as an alkyl- or aryl-substituent polyethyleneglycol; a polyvinylalcohol; an alkyl substituent cellulose; polyvinylpyrrolidone; polyacrylic acid derivatives. These emulsifiers (dispersants) may be used alone or in combination.

The use amount of the emulsifier (dispersant) is preferably decreased as much as possible unless the dispersion stability of the water-based latex of the polymer fine particles is adversely affected. Further, the emulsifier (dispersant) is more preferable as it has a higher water-solubility. If the water-solubility is high, the emulsifier (dispersant) is easy to be removed by washing with water and an adverse effect on a condensation polymer obtained finally can be prevented easily.

(Core-Shell Polymer Composition)

As described above, in order to make a molded article and a cured product of the rubbery polymer-containing resin composition of the invention more transparent, the rubbery polymer-containing resin composition of the invention preferably contains a core-shell polymer composition, that is, a polymer particle. Such the core-shell polymer composition is a core-shell polymer composition obtained by forming a hard polymer having a glass transition temperature of higher than 0° C. and obtained by polymerization of 5 to 100 parts by weight of hard polymer-constituting components in the presence of 100 parts by weight of the rubbery polymer, and in terms of sufficient improvement effect of mechanical strength, prevention of occurrence of agglomeration at the time of handling polymer particles, and accordingly improvement of the handling property, the amount of the hard polymer-constituting components is adjusted to be preferably 10 to 67 parts by weight and more preferably 15 to 30 parts by weight to 100 parts by weight of the rubbery polymer.

(Hard Polymer)

The hard polymer of the invention takes a role of improving the compatibility of the polymer particles with the matrix resin and dispersing the polymer particles in a primary particle state in a matrix or a molded article or a cured product of the composition of the invention. As described above, a Tg of such a hard polymer is preferably higher than 0° C. and in terms of recovery of the core-shell polymer of the invention in form of a powder, it is more preferably 25° C. or higher and even more preferably 50° C. or higher.

Preferably, the outermost shell layer is composed of a polymer formed by polymerization of the hard polymer-constituting components, in an amount of 100% by mass in total and uneven precipitation of the polymer particles in the matrix resin can be prevented in such a manner and further, the hard polymer takes a role of improving the compatibility of the polymer fine particles with the cycloaliphatic epoxy resin and dispersing the polymer fine particles in the cycloaliphatic epoxy resin or a cured product of the cycloaliphatic epoxy resin composition in a primary particle state, and further the refractive index $n_s$ of the shell layer can be close to the refractive index $n_E$ of a cured product of the cycloaliphatic epoxy resin and practically the refractive index $n_s$ is in a range of $n_s=n_E\pm 0.01$ The shell layer is preferably grafted with the elastic core layer. More accurately, the monomer components to be used for the shell layer formation are preferably graft polymerized with the polymer forming the elastic core layer to substantially chemically bond the shell layer and the elastic core layer. In the invention, preferably 70% by mass or higher, more preferably 80% by mass or higher, and even more preferably 90% by mass or higher of the polymer constituting the shell layer is chemically bonded with the elastic core layer.

The outermost shell layer is preferably of a polymer formed by polymerizing monomers for producing a shell layer polymer consisting of 0% to 43% by mass of a (meth) acrylic acid ester having at least one aromatic ring in the molecule thereof, 15% to 58% by mass of a (meth)acrylic acid ester having at least one circular ether structure in the molecule thereof, 2% to 15% by mass of a polyfunctional monomer, 0% to 83% by mass of another (meth)acrylic acid ester, and 0% to 43% by mass of another vinyl monomer, in an amount of 100% by mass in total and such polymerization makes it possible to make the refractive index $n_s$ of the shell layer close to the refractive index $n_E$ of a cured product of the cycloaliphatic epoxy resin and specifically to make $n_s$ be in a range of $n_s=n_E\pm 0.01$.

The shell layer is preferably grafted to the elastic core layer. More accurately, the monomer components to be used for forming a shell layer are preferably graft polymerized with the polymer forming the elastic core layer to substantially chemically bond the shell layer and the elastic core layer. In the invention, preferably 70% by mass or higher, more preferably 80% by mass or higher, and even more preferably 90% by mass or higher of the polymer constituting the shell layer is chemically bonded with the elastic core layer.

(Hard Polymer-Constituting Component)

As described above, as the monomers for producing a shell layer polymer, (meth)acrylic acid ester type monomers are used preferably in terms of the light stability and transparency of a cured product and particularly, in terms of the dispersibility and/or high refractive index, butyl acrylate, methyl methacrylate, phenoxyethyl acrylate, and glycidyl methacrylate are preferably used. Furthermore, in terms of the dispersibility, in the case the shell layer contains carbon-carbon double bonds, allyl methacrylate and triallyl isocyanurate are preferably used as the polyfunctional monomer. Hereinafter, it will be described in more detail.

As described above, the monomers for producing a shell layer polymer contain preferably 0% to 43% by mass of a (meth)acrylic acid ester having at least one aromatic ring in the molecule thereof, more preferably 0% to 40% by mass, and even more preferably 0% to 30% by mass.

The (meth)acrylic acid ester having at least one aromatic ring in the molecule thereof; namely, aromatic ring-containing (meth)acrylates have been already described in the paragraph ((meth)acrylic acid ester having at least one aromatic ring in the molecule thereof)

As described above, the monomers for producing a shell layer polymer contain preferably 15% to 58% by mass of the (meth)acrylic acid ester having at least one cyclic ether structure in the molecule thereof, more preferably 20% to 50% by mass, and even more preferably 20% to 40% by mass.

The (meth)acrylic acid ester having at least one cyclic ether structure in the molecule thereof has been already described in the paragraph ((meth)acrylic acid ester having at least one cyclic ether structure in the molecule thereof) and particularly, since glycidyl methacrylate and 3-ethyl-3-oxetanylmethyl methacrylate are monomers suitable for providing the shell layer of the invention with compatibility with the cycloaliphatic epoxy resin, which is a matrix resin, their contents in the monomers for producing a shell layer polymer are preferably higher than the contents in the monomers for producing a rubbery polymer.

As described above, the monomers for producing a shell layer polymer contain preferably 2% to 15% by mass of a polyfunctional monomer, more preferably 2% to 10% by mass, and even more preferably 4% to 10% by mass.

The polyfunctional monomer has been already described in the paragraph (Polyfunctional monomer) and particularly, in terms of considerable contribution to providing the shell layer of the invention with dispersibility in the cycloaliphatic epoxy resin, which is the matrix resin, in the case the shell layer contains carbon-carbon double bonds, allyl methacrylate and triallyl isocyanurate are preferable.

As described above, the monomers for producing a shell layer polymer contain preferably 0% to 83% by mass of another (meth)acrylic acid ester, more preferably 10% to 80% by mass, and even more preferably 20% to 70% by mass.

The other (meth)acrylic acid ester has been already described in the paragraph (Another (meth)acrylic acid ester) and in terms of the contribution to providing the shell layer with dispersibility in and compatibility with the cycloaliphatic epoxy resin, which is the matrix resin, one or more monomers selected from butyl acrylate and methyl methacrylate are preferable.

As described above, the monomers for producing a shell layer polymer contain preferably 0% to 43% by mass of another vinyl monomer, more preferably 0% to 40% by mass, and even more preferably 0% to 30% by mass.

The other vinyl monomer has been already described in the paragraph (Another vinyl monomer) and preferably styrene.

Next, grafting components in graft copolymer of the component (B) are described. The grafting components may be acrylic acid ester, methacrylic acid ester, aromatic vinyl, and monomers copolymerizable therewith. Examples of the grafting components include acrylic acid, methacrylic acid, 2-hydroxyethylacrylate, 2-methoxyethylacrylate, glycidylacrylate, 2-hydroxyethylmethacrylate, 2-methoxyethylmethacrylate, glycidylmethacrylate, in addition to the monomers shown in the rubbery polymer.

Examples of the grafting components are 0% to 30% by weight of an acrylic acid ester, 30% to 100% by weight of a methacrylic acid ester, 0% to 60% by weight of aromatic vinyl, 0% to 30% by weight of a monomer copolymerizable with these monomers and more preferable examples may include a monomer mixture containing 0% to 20% by weight of n-butyl acrylate, 30 to 70% by weight of methyl methacrylate, 30% to 60% by weight of styrene, and 0% to 20% by weight of a monomer copolymerizable with these monomers.

As described above, in terms of the light stability and transparency of a cured product, (meth)acrylic acid ester type monomers are preferably used as the hard polymer-constituting components and particularly in terms of dispersibility and/or high refractive index, butyl acrylic acid ester, methyl methacrylate, phenoxyethyl acrylic acid ester, and glycidyl methacrylate are preferably used. Furthermore, in terms of the dispersibility, in the case the shell layer contains carbon-carbon double bonds, allyl methacrylate and triallyl isocyanurate are preferably used as the polyfunctional monomer. Hereinafter, it will be described in more detail.

As described above, the hard polymer-constituting components contain preferably 0% to 43% by mass of a (meth)acrylic acid ester having at least one aromatic ring in the molecule thereof, more preferably 0% to 40% by mass, and even more preferably 0% to 30% by mass.

The (meth)acrylic acid ester having at least one aromatic ring in the molecule thereof; that is, aromatic ring-containing (meth)acrylic acid esters will be described in more detail in the following ((Meth)acrylic acid ester having at least one aromatic ring in the molecule thereof).

As described above, the hard polymer-constituting components contain preferably 15% to 58% by mass of a (meth)acrylic acid ester having at least one cyclic ether structure in the molecule thereof, more preferably 20% to 50% by mass, and even more preferably 20% to 40% by mass.

The (meth)acrylic acid ester having at least one cyclic ether structure in the molecule thereof will be described in the following ((Meth)acrylic acid ester having at least one cyclic ether structure in the molecule thereof) and particularly, in the case the cycloaliphatic epoxy resin is used as a matrix resin, glycidyl methacrylate and 3-ethyl-3-oxetanylmethyl methacrylate are preferable since being suitable as monomers for providing the shell layer of the invention with compatibility with the matrix resin.

As described above, the hard polymer-constituting components contain preferably 2% to 15% by mass of a polyfunctional monomer, more preferably 2% to 10% by mass, and even more preferably 4% to 10% by mass.

The polyfunctional monomer has been already described in (Polyfunctional monomer) and particularly, in terms of further significant contribution for providing the shell layer of the invention with dispersibility in the matrix resin, in the case the shell layer contains carbon-carbon double bonds, allyl methacrylate and triallyl isocyanurate are preferable.

As described above, the hard polymer-constituting components contain preferably 0% to 83% by mass of another (meth)acrylic acid ester, more preferably 10% to 80% by mass, and even more preferably 20% to 70% by mass.

The other (meth)acrylic acid ester will be described in detail in the following (Another (meth)acrylic acid ester) and in terms of the contribution to providing the shell layer with dispersibility in and compatibility with the matrix resin, one or more monomers selected from butyl acrylate and methyl methacrylate are preferable.

As described above, the monomers for producing a shell layer polymer contain preferably 0% to 43% by mass of another vinyl monomer, more preferably 0% to 40% by mass, and even more preferably 0% to 30% by mass.

The other vinyl monomer will be described in the following (Another vinyl monomer) and preferably styrene.

((Meth)Acrylic Acid Ester Having at Least One Cyclic Ether Structure in the Molecule Thereof)

The polymer particle of the invention is formed by polymerization of monomers for producing a polymer particle containing preferably 2% to 10% by mass of a (meth)acrylic acid ester having at least one cyclic ether structure in the molecule thereof, more preferably 3% to 9% by mass and even more preferably 4% to 8% by mass.

Examples of the (meth)acrylic acid ester having at least one cyclic ether structure in the molecule thereof, that is, a cyclic ether structure containing (meth)acrylic acid esters include glycidyl(meth)acrylic acid ester, glycidylalkyl(meth)acrylic acid ester, 3,4-epoxycyclohexylmethyl(meth)acrylic acid ester, 3-ethyl-3-oxetanylmethyl(meth)acrylic acid ester.

Among them, glycidylmethacrylic acid ester, 3,4-epoxycyclohexylmethylmethacrylic acid ester, and 3-ethyl-3-oxetanylmethylmethacrylic acid ester are preferred. In view of the dispersion stability in a cured product, glycidylmethacrylic acid ester, and 3-ethyl-3-oxetanylmethylmethacrylic acid ester are particularly preferred.
(Resin (A))

As described above, a resin composition obtained by adding, as a core-shell polymer composition (B), the rubbery polymer-containing resin composition of the invention to at least one resin (A) selected from the group consisting of thermoplastic resins, thermosetting resins, and elastomer resins, that is a matrix resin, is also included in the rubbery polymer-containing resin composition of the invention and such the resin composition provides a molded article or a cured product to be obtained finally with high transparency and excellent mechanical strength. Examples preferable as the resin (A) may include thermoplastic resins that can be easily molded by melt molding.

In terms of providing the matrix resin with high transparency and excellent mechanical strength, the use amount of the core-shell polymer composition (B) to the matrix resin is preferably 0.1 parts by weight or higher, more preferably 0.5 parts by weight or higher, and even more preferably 1 part by weight or higher to 100 parts by weight of the matrix resin, and in terms of ensuring mold processability and curing property after compounding of the resin composition, it is preferably 100 parts by weight or lower, more preferably 25 parts by weight or lower, and even more preferably 5 parts by weight or lower.
(Thermoplastic Resin)

Examples of the thermoplastic resin include vinyl based polymer resins or vinyl based copolymer resins obtained by polymerizing or copolymerizing at least one vinyl monomer selected from the group consisting of polycarbonate resins, polyester resins, polyester carbonate resins, polyphenylen ether resins, polyphenylen sulfide resins, polyether sulfone resins, polysulfone type resins, polyarylene resins, polyamide resins such as nylon, polyether imide resins, polyacetal resins such as polyoxymethylene, polyvinylacetal resins, polyketone resins, polyether ketone resins, polyether ether ketone resins, polyarylketone resins, polyethernitrile resins, liquid crystal resins, polybenzimidazole resins, polyparabanic acid resin, diene compounds, maleimide compounds, aromatic alkenyl compounds, methacrylic acid ester, acrylic acid ester, and vinyl cyanide compounds; another vinyl based resin; polyolefin based resins, vinyl chloride based resins. These thermoplastic resins may be used alone or as a combination of two or more. The thermoplastic resins at least one selected from the group consisting of vinyl chloride based resins, acrylic based resins, and styrene based resins are preferred, vinyl chloride based resins which are excellent in transparency and light stability, and further used widely, are particularly preferred.
(Vinyl Chloride Type Resin)

The vinyl chloride type resin includes a vinyl chloride homopolymer, copolymers of vinyl chloride and another vinyl monomer having at least one double bond copolymerizable with the vinyl chloride, chlorinated vinyl chloride resins and chlorinated polyethylene resins, and the amount of another vinyl monomer in the copolymers is preferably 50% by weight or lower and more preferably 45% by weight or lower.

Examples of the other vinyl monomer having at least one double bond may include ethylene, propylene, vinyl acetate, (meth)acrylic acid and esters thereof, maleic acid and esters thereof, vinylidene chloride, vinyl bromide, and acrylonitrile.

These vinyl chloride type resins are obtained by homopolymerization or copolymerization of vinyl chloride alone or vinyl chloride with another vinyl monomer in the presence of a radical polymerization initiator. The polymerization degree of the vinyl chloride type resins is generally 400 to 4500 and particularly preferably 400 to 1500.
(Acrylic Resin)

The acrylic resin is preferably an acrylic resin having a glass transition temperature of 120° C. or higher and a refractive index of 1.50 or higher. Specific examples include acrylic resins containing a glutarimide structure, a glutaric acid anhydride structure, and a lactone structure as main units in the molecule. Particularly, those having a refractive index of 1.52 to 1.56 are preferable and acrylic resin having a glutarimide structure (hereinafter, referred to as glutarimide acrylic resin) is preferably used.
(Another Vinyl Resin)

As another vinyl resin, used are polymer resins or copolymer resins obtained by polymerization or copolymerization of at least one kind monomer selected from diene compounds, maleimide compounds, aromatic alkenyl compounds, methacrylic acid esters, acrylic acid esters, and vinyl cyanide compounds.

Examples of the polymer resins or copolymer resins include polystyrene resin, s-polystyrene resin, polymethylmethacrylate resin, polychlorostyrene resin, polybromostyrene resin, poly-α-methylstyrene resin, styrene-acrylonitrile copolymer resin, styrene-methylmethacrylate copolymer resin, styrene-maleic anhydride copolymer resin, styrene-maleimide copolymer resin, styrene-N-phenylmaleimide copolymer resin, styrene-N-phenylmaleimide-acrylonitrile copolymer resin, methylmethacrylate-butylacrylic acid ester copolymer resin, methylmethacrylate-ethylacrylic acid ester copolymer resin, styrene-acrylonitrile-α-methylstyrene ternary copolymer resin, butadiene-styrene copolymer (HIPS) resin, acrylonitrile-butadiene rubber-styrene copolymer (ABS) resin, acrylonitrile-butadiene rubber-α-methylstyrene copolymer resin, aromatic alkenyl compound-diene-vinyl cyanide-N-phenyl maleimide copolymer resin.
(Thermosetting Resin)

Examples of the thermosetting resin include epoxy resins, phenol resins, urea resins, melamine resins, polyimide resins, polyamide imide resins, thermosetting polyester resins (unsaturated polyester resins), alkyd resins, silicon resins, urethane resins, polyvinylester resins, polyphthalic acid diallyl resins, bismaleimide-triazine resin, fran resins, xylene resins, guanamine resins, maleic resin, dicyclopentadiene resin. Cycloaliphatic epoxy resins which are excellent in transparency and light stability are more preferred.
(Elastomer Resin)

Examples of the elastomer resin include various elastomer resins such as natural rubber or synthetic rubbers. Examples of the synthetic rubbers include acrylic rubbers such as butylacrylic acid ester rubber, ethylacrylic acid ester rubber, and octylacrylic acid ester rubber; nitrile rubbers such as butadiene-acrylonitrile type copolymers; chloroprene rubber, butadiene rubber, isoprene rubber, isobutylene rubber, styrene-butadiene rubber, methylmethacrylate-butylacrylic acid ester block copolymer, styrene-isobutylene block copolymer, styrene-butadiene block copolymer, hydrogenated styrene-butadiene block copolymer, ethylene-propylene copolymer (EPR), hydrogenated ethylene-butadiene copolymer (EPDM), polyurethane, chlorosulfonated polyethylene, silicone rubber (milable type, vulcanizable at room temperature type and the like), butyl rubber, fluoro rubbers, olefin type thermoplastic elastomer, styrene type thermoplastic elastomer, vinyl chloride type thermoplastic elastomer, urethane type thermoplastic elastomer, polyamide type thermoplastic elastomer, polyester type thermoplastic elastomer, fluorinated thermoplastic elastomer.

(Mixing)

Mixing of the core-shell polymer composition (B) of the invention and the resin (A), namely, the matrix resin, may be carried out by a conventionally known method, and in the case the resin (A) is a thermosetting resin, the mixing can be easily carried out by using a conventionally known kneading machine and examples of such a kneading machine may include a mixing roll, a calender roll, a Bumbury's mixer, a Henschel mixer, a ribbon blender, a kneader, an extruder, a blow molding apparatus, an inflation molding apparatus. In the case the resin (A) is a thermosetting resin, a method described in the following (Preparative method of thermosetting rubbery polymer-containing resin composition) is preferably employed from a viewpoint of obtaining a rubbery polymer-containing resin composition containing core-shell polymer composition (B) evenly dispersed therein and few impurities.

(Preparative Method of Thermosetting Rubbery Polymer-Containing Resin Composition)

A production method of the thermosetting rubbery polymer-containing resin composition, for example, a production method of the cycloaliphatic epoxy resin composition of the invention, preferable includes successively a first step of obtaining a moderate polymer particle agglomerate; a second step of obtaining a polymer particle dispersion; and a third step of obtaining a thermosetting resin rubbery polymer-containing resin composition.

(First Step: Preparation of Moderate Polymer Particle Agglomerate)

The first step includes an operation of mixing an organic solvent with a solubility of not lower than 5% by mass and not higher than 40% by mass in water at 20° C. (particularly not higher than 30% by mass) and a water-based latex containing polymer particles obtained by emulsion polymerization. Use of the organic solvent leads to phase separation (described below) by further adding water after the mixing operation to agglomerate the polymer particles in a moderate state to such an extent that the polymer particles can be dispersed again.

Examples of the organic solvent with a solubility of not lower than 5% by mass and not higher than 40% by mass in water at 20° C. include ketones such as methyl ethyl ketone, esters such as methyl formate, methyl acetate, and ethyl acetate, ethers such as diethyl ether, ethylene glycol diethyl ether, and tetrahydropyrane, acetals such as methylal, and alcohols such as isobutyl alcohol, and sec-butyl alcohol. These organic solvents may be used alone or in combination.

The organic solvent to be used in the first step may be an organic solvent mixture as long as the mixture as a whole shows a solubility of not lower than 5% by mass and not higher than 40% by mass in water at 20° C. For example, the organic solvent mixture may be a suitable combination of two or more selected from low water-soluble organic solvents and high water-soluble organic solvents; examples of the low water-soluble organic solvent may include ketones such as methylpropylketone, diethylketone, methylisobutylketone, and ethylbutylketone; esters such as diethylcarbonate, butyl formate, propyl acetate, and butyl acetate; ethers such as diisopropyl ether, and dibutyl ether; aliphatic hydrocarbons such as pentane, hexane, heptane, and octane; aromatic hydrocarbons such as benzene, toluene, and xylene; and halogenated hydrocarbons such as methylene chloride, and chloroform; and examples of the high water-soluble organic solvent may include ketones such as acetone, and cyclohexanone; esters such as γ-valerolactone, and ethyleng- lycol monomethylether acetate; alcohols such as ethanol, isopropylalcohol, and t-butylalcohol; and tetrahydrofuran.

The organic solvent used in the first step is preferably one having a specific gravity lower than that of water in terms of easily removing the liquid phase (mainly water phase) in the second step described below. The amount of the organic solvent to be mixed with the water-based latex is preferably 50 parts by weight or higher (particularly 60 parts by weight or higher) and 250 parts by weight or lower (particularly 150 parts by weight or lower) to 100 parts by weight of the water-based latex.

A known technology can be used for the mixing operation of the water-based latex and organic solvent. For example, a common device such as a stirring tank equipped with stirring blades may be used and also a static mixer (a static mixing apparatus) and a line mixer (a type of a stirring apparatus built in a portion of a pipeline) may be used.

The first step includes an operation of adding and mixing excess water after the operation of mixing the water-based latex and organic solvent. Accordingly, phase separation is caused to agglomerate the polymer particles in a moderate state. Further, at the same time, the water-soluble emulsifier or dispersant used for the preparation of the water-based latex, the water-soluble polymerization initiator, or almost all electrolytic substances such as a reducing agent or the like can be eluted to the water phase.

The amount of water to be mixed is preferably 40 parts by weight or higher (particularly 60 parts by weight or higher) and 300 parts by weight or lower (particularly 250 parts by weight of lower) to 100 parts by weight of the organic solvent used for being mixed with the water-based latex from a viewpoint that the polymer fine particles are moderately agglomerated and the dispersibility of the polymer fine particles is improved to keep the organic solvent concentration in the agglomerated polymer fine particles be a certain concentration and to avoid prolongation of the time taken for re-dispersion of the agglomerated polymer fine particles in the second step described below.

(Second Step: Preparation of Polymer Particle Dispersion)

The second step includes an operation of obtaining polymer particle dope by separating and recovering the agglomerated polymer particles from the liquid phase. The operation is for separating and removing water-soluble foreign substances such as an emulsifier from the polymer particles.

A method for separating and recovering the agglomerated polymer particles from the liquid phase may be methods for discharging the liquid phase (mainly water phase) from the bottom part of the stirring tank or filtering the liquid phase using filter paper, filter cloths, and metal screens with relatively coarse meshes in the case the stirring tank is used in the first step, since the agglomerated polymer particles generally float to the surface of the liquid phase.

The amount of the organic solvent to be contained in the polymer particle agglomerate is preferably 30% by mass or higher (particularly 35% by mass or higher) and 75% by mass or lower (particularly 70% by mass of lower) in the entire mass of the polymer particles in terms of prevention of the time taken for re-dispersion of the polymer fine particle dope in an organic solvent (described below) from prolongation, prevention of easy remaining of the irreversible agglomerates, and prevention of dissolution and remaining of a large quantity of water in the organic solvent to make the polymer fine particles hard to be agglomerated in the third step.

In this specification, the organic solvent amount contained in the agglomerate of the polymer fine particles is obtained by drying the agglomerate of the polymer fine particles at 120°

C. for 15 minutes after precise weighing and determining the decreased weight as the organic solvent amount contained in the agglomerate.

The second step includes an operation of mixing the agglomerate of the polymer particles with an organic solvent. Since the polymer particles are agglomerated in a moderate state, the polymer particles can be easily dispersed again in a primary particle state in the organic solvent by being mixed with the organic solvent.

Examples of the organic solvent to be used in the second step may include examples of the organic solvents usable for the first step. Use of such an organic solvent makes it possible to remove water contained in the polymer particles by azeotropic boiling with water at the time of removing the organic solvent in the third step described below. The organic solvent to be used in the second step may be different from the organic solvent used in the first step; however, it is preferable to use the same type of the organic solvent in the second step as that used in the first step in terms of further ensuring re-dispersion of the agglomerate.

The mixing amount of the organic solvent to be used in the second step is preferably 40 parts by weight or higher (particularly 200 parts by weight or higher) and 1400 parts by weight or lower (particularly 1000 parts by weight of lower) to 100 parts by weight of the agglomerate of the polymer particles in terms of sufficient prevention of the polymer fine particles from becoming difficult to be dispersed in the organic solvent or prevention of the polymer fine particles from becoming difficult to be handled due to remaining of the agglomerated polymer fine particles in a bulk form or increase of the viscosity and also saving of energy and usability of a small-scale apparatus for evaporation and removal of the organic solvent in the third step described below.

In the invention, it is preferable to carry out one or more times an operation of separating and removing the agglomerated polymer particles from the liquid phase, mixing the polymer particles with an organic solvent with a solubility of not lower than 5% by mass and not higher than 40% by mass in water at 20° C. again, and then further mixing them with an excessive amount of water to agglomerate the polymer particles between the first step and the second step. This makes it possible to reduce the remaining amount of water-soluble foreign substances such as an emulsifier contained in the polymer particle dope.

(Third Step: Preparation of Thermosetting Rubbery Polymer-Containing Resin Composition)

The third step includes an operation of replacing the organic solvent in the organic liquid containing the polymer particles obtained in the second step with, for example, a thermosetting resin such as a cycloaliphatic epoxy resin. The operation makes it possible to obtain a thermosetting resin composition containing the polymer particles dispersed in state of primary particles. Further, the water remaining in the agglomerate of the polymer particles can be distilled off by azeotropic removal.

The mixing amount of the thermosetting resin to be used in the third step may be properly adjusted in accordance with the polymer particle concentration in the finally desired thermosetting resin composition. For example, from a viewpoint that an aimed effect of enhancing toughness and a stress-lowering effect are sufficiently obtained and sufficient heat resistance is maintained in a transparent cured product of the invention obtained by using the cycloaliphatic epoxy resin composition of the invention, the polymer particles are contained in an amount of preferably 1% by mass or higher (more preferably 2% by mass or higher and even more preferably 3% by mass or higher) and 60% by mass or lower (more preferably 50% by mass or lower and even more preferably 40% by mass or lower) in the cycloaliphatic epoxy resin or the like, which is a preferable thermosetting resin composition.

A conventionally known method can be employed as the method for distilling off the organic solvent. Examples of the method may include a method of loading a mixture of the organic liquid and the cycloaliphatic epoxy resin into a tank and distilling off the organic solvent by heating under reduced pressure; a method of counter-flow contact of a drying gas and the mixture described above in a tank; a continuous method by using a thin film type evaporator; and a method by using an extruder or a continuous stirring tank equipped with an evaporation mechanism. The conditions of temperature and time to be taken in the case of distilling off the organic solvent can be properly selected in such a range that the quality of the cycloaliphatic epoxy resin composition to be obtained is not deteriorated. Further, the amount of volatile matter remaining in the cycloaliphatic epoxy resin composition can be properly selected in accordance with the applications of the cycloaliphatic epoxy resin composition and in such a range that no problem is caused.

(Molded Article and Cured Product)

If the rubbery polymer-containing resin composition of the invention is molded or cured, for example, the cycloaliphatic epoxy resin composition of the invention is cured, the obtained molded article or cured product with a thickness of 3 mm is excellent in transparency and light stability and has 80% or higher of an optical transmittance in a wavelength range of 380 to 800 nm.

A molding method and a curing method may be properly selected and examples of a molding method of a thermoplastic resin composition may include an injection molding method, an extrusion molding method, melt extrusion film formation, a blow molding method, a calender molding method, an inflation molding method, a rotary molding method, compression formation and spinning formation, and examples of a curing method of a thermosetting resin composition may include conventional curing methods by employing, for example, a curing agent and a catalyst, a function of heat, light (ultraviolet rays), and radiation beam (electron beam or the like) and a combination thereof, and examples of a molding method of an elastomer resin composition may include molding methods such as slush molding, injection molding, and heat press molding and if necessary, vulcanization to obtain a molded article. Further, at the time of molding with curing, for example, in the case the rubbery polymer-containing resin composition of the invention is used as the cycloaliphatic epoxy resin composition, conventionally known molding methods such as a transfer molding method, an injection molding method, a casting method, a cast method, and a coating and baking method are preferable since a cured product can be obtained. Furthermore, it is also possible to employ a solution casting method and a spin coating method by dissolving the resin composition of the invention in a solvent which can melt the resin composition and then subjecting the resulting solution to molding. Any of the methods can be employed; however a melt extrusion film formation method using no solvent is preferably employed in terms of the production cost and the effect of the solvent on global environments and working environments.

Since a molded product or a cured product obtained from the rubbery polymer-containing resin composition of the invention, for example, the cycloaliphatic epoxy resin composition of the invention, are excellent in transparency and mechanical properties, the molded product or cured product can be preferably used for sealing materials for optical semiconductor devices represented by light-emitting devices such as electroluminescent diodes (LED), light-receiving devices such as photodiodes, and photoelectric conversion devices such as CCD.

Further, the molded article of the rubbery polymer-containing resin composition of the invention is suitable as optical films, and since the core-shell polymer (B) of the invention is contained, an effect for improving the bending resistance, which is a mechanical property, can be obtained and such optical films can be preferably used for imaging fields such as photographing lenses, finders, filters, prisms, and Fresnel lenses of cameras, VTR, and projectors; lens fields such as pick-up lenses for optical discs of CD players, DVD players, and MD players; optical recording fields for optical discs of CD players, DVD players, and MD players; information technology devices such as light guide plates for liquid crystals, films for liquid crystal displays, e.g., polarizer protection films and phase difference films, and surface protection films; optical communication fields such as optical fibers, optical switches, and optical connectors; vehicle fields such as automotive head light and tail lamp lenses, inner lenses, equipment covers, and sunroofs; medical equipment fields such as spectacles and contact lenses, lenses of endoscopes, and medical goods needed for sterilization treatment; construction/building material fields such as translucent plates for roads, lenses for pair glass, transom windows, car ports, lenses for lighting, lighting covers, and sizing for building materials; microwave cooking containers (tableware); as well as functional films for moisture prevention and heat retention for agriculture, electric insulators for capacitors and motors, and prevention of static charge, shields of heat beam, and shields of ultraviolet rays; industrial and ordinal decoration films such as tapes, labels, and seals; and films for preservation media such as negative films and videotapes.

An optical film produced by using the rubbery polymer-containing resin composition of the invention as a raw material is excellent in optical properties such as optical evenness and light transparency as being clear from above. Therefore, based on the optical properties, the optical film can be particularly suitably used for known optical applications for peripheral parts of liquid crystal display devices such as optically isotropic films, polarizer protection films, and transparent and conductive films.

Further, since the optical film can be used as a polarizing plate by being stuck to a polarizer, the optical film can be used as a polarizer protection film of a polarizing plate. The polarizer is not particularly limited and may include conventionally known arbitrary polarizers. Specifically, a polarizer obtained by adding iodine to stretched polyvinyl alcohol can be exemplified.

(Curing Agent)

As the curing agent, an acid anhydride curing agent or a cationic polymerization initiator may be preferably used.

Examples of the acid anhydride curing agent include tetrahydrophthalic anhydride, hexyahydrophthalic anhydride, methyltetrahydrophthalic anhydride, methylhexahydrophthalic anhydride, methylnadic anhydride, hydrogenated methylnadic anhydride, trialkyltetrahydrophthalic anhydride, phthalic anhydride, trimellitic anhydride, pyromellitic anhydride, and ethylenglycol bisanhydro trimellitate. These acid anhydride curing agents may be used alone or as a combination of two or more. Among these acid anhydride curing agents, in view of light resistance of a cured product, hexyahydrophthalic anhydride, methylhexahydrophthalic anhydride, and hydrogenated methylnadic anhydride are preferred.

In the case of using the acid anhydride curing agent, an accelerator can be used with the curing agent for hardening acceleration. Examples of the accelerator include imidazoles such as 2-ethyl-4-methyl imidazole, 2-phenyl imidazole, tertiary amines such as tris(dimethylaminomethyl)phenol, and benzyldimethylamine, quaternary ammonium salts such as tetraethylammonium bromide and tetrabutylammonium bromide, quaternary phosphonium salts such as tetra-n-butylphosphonium tetraphenyl borate, tetra-n-butylphosphonium bromide, and tetraphenylphosphonium bromide, and metallic salts such as zinc octylate and tin octylate.

The use amount of the acid anhydride curing agent is preferably 10 to 100 parts by weight to 100 parts by weight of the rubbery polymer-containing resin composition of the invention, for example, 100 parts by weight of the cycloaliphatic epoxy resin composition of the invention in terms of the balance of heat resistance and moisture resistance of a cured product. Further, in the case of use of a curing accelerator, it is preferable to use 0.01 to 10 parts by weight of the curing accelerator to 100 parts by weight of the rubbery polymer-containing resin composition of the invention, for example, 100 parts by weight of the cycloaliphatic epoxy resin composition of the invention.

Examples of the cationic polymerization initiator include aromatic sulfonium salts with anion such as hexafluoroantimonate, hexafluorophosphate, and tetraphenylborate; onium salts such as aromatic iodonium salts; and metallocene salts. These cationic polymerization initiators may be used alone or as a combination of two or more.

The use amount of the cationic polymerization initiator is preferably 0.05 to 5 parts by weight to 100 parts by weight of the rubbery polymer-containing resin composition of the invention, for example, 100 parts by weight of the cycloaliphatic epoxy resin composition of the invention in terms of the balance of heat resistance and moisture resistance of a cured product.

(Film)

The thickness of an optical film of the invention is not particularly limited and it is preferably 10 µm to 200 µm, more preferably 15 µm to 150 µm, and even more preferably 20 µm to 100 µm. If the thickness of the film is within the range, the film can be an optical film having even optical properties and a good haze.

The optical film of the invention has a haze of preferably 3% or lower, more preferably 2% or lower, and even more preferably 1% or lower. If the haze of the optical film of the invention is in the above-mentioned range, the transparency of the film can be high. Accordingly, the optical film of the invention can be suitably used for applications required to have a high transparency.

The optical film of the invention has a total luminous transmittance of preferably 85% or higher and more preferably 88% or higher. If the total luminous transmittance is within the range, the transparency of the film can be high. Accordingly, the optical film of the invention can be suitably used for applications required to have high transparency.

EXAMPLES

The invention will be described in more detail with reference to Examples and Comparative Examples; however it should be noted that the invention is not limited to these Examples. Various modifications of the invention can be properly made and carried out in the scope without departing from the purport of the foregoing and the following descriptions, and they fall within the technical scope of the invention.

First, with respect to a cycloaliphatic epoxy resin composition, which is a rubbery polymer-containing resin composition of the invention, hereinafter, the invention will be described in more detail with reference to Examples and Comparative Examples. A cycloaliphatic epoxy resin composition of the invention obtained by adding a core-shell polymer, which is a rubbery polymer-containing resin composition of the invention, to a cycloaliphatic epoxy resin has a characteristic, that is, excellent toughness as a mechanical property.

(Evaluation Method)

First, evaluation methods of cycloaliphatic epoxy resin compositions of respective Examples and Comparative Examples and cured products thereof will be described.

[1] Measurement of Viscosity

The viscosity of each cycloaliphatic epoxy resin composition sample was measured by using a digital viscometer DV-II+Pro model manufactured by BROOKFIELD. Spindles CPE-41 and CPE-52 were separately used in accordance with the viscosity regions and the viscosity was measured at a measurement temperature of 50° C. and Shear Rate of 10 (1/s).

[2] Optical Physical Property of Cured Product

A cast cured plate with a size of width 30 mm×height 40 mm×thickness 3 mm was produced from each cycloaliphatic epoxy resin composition sample as a raw material and the optical transmittance in wavelength of 380 to 800 nm was measured for the cured plate by using U-3310 type spectrophotometer manufactured by Hitachi Ltd. Optical transmittances for three wavelengths, 380, 540, and 700 nm as representative values were recorded.

[3-1] Observation of Dispersion State of Polymer Particles by Transmission Electron Microscope A portion of each obtained cured product was cut out and polymer particles were dyed with ruthenium oxide or osmium oxide, thereafter, a thin section was cut out and observed at 40000 times magnification by using a transmission electron microscope (JEM-1200 Ex, manufactured by JEOL Ltd.). Using the particle dispersion ratio calculated by the following method as an index, the dispersion state of the polymer particles in the cured product was determined.

Good: 90% or higher of particle dispersion ratio
Poor: less than 90% of particle dispersion ratio

[3-2] Calculation of Particle Dispersion Ratio

In the obtained transmission electron microscopic photograph, four sections with 5 cm square area were selected at random and the total number $B_0$ of the polymer particles and the number $B_1$ of polymer particles being in contact with three or more particles (in addition, in the case one polymer particle was in contact with m in number of polymer particles, the number was counted as m) were measured and the calculation was carried out according to the following expression 1.

[Expression 1]

$$\text{Particle dispersion ratio (\%)} = (1-(B_1/B_0)) \times 100 \quad \text{(Expression 1)}$$

[4] Measurement of Rupture Toughness

Each cured plate sample was cut into a specimen with a size of length 2.5 inch, width (b) 0.5 inch, and thickness (h) 5 mm and then a V-notch was formed by a notching machine. Thereafter, a crack reaching the center of the specimen was formed from the tip end of the V-notch with a razor blade. After the specimen was aged at 23° C., three-point bending test was carried out in condition of 50 mm of supporting point distance L and 1 mm/min of test speed by using an autograph AG-2000E (manufactured by Shimadzu Corporation). Using the maximum strength F (kN) obtained by the bending test, the rupture toughness value K1c (MPa·m$^{1/2}$) was calculated according to the following expressions 2 and 3. Herein, the reference character a denotes the sum of the depth of the V-notch and the length from the tip end of the V-notch to the tip end of the crack and units of L, h, a, and b were cm.

[Expression 2]

$$K1c = (F \times L/(h \times b^{3/2})) \times f \quad \text{(Expression 2)}$$

[Expression 3]

$$f = 3(a \times b)^{1/2} \times AA/BB$$

$$AA = 1.99 - (a/b)\{1-(a/b)\}\{2.15 - 3.93(a/b) + 2.7(a/b)^2\}$$

$$BB = 2\{1+2(a/b)\}\{1-(a/b)\}^{3/2} \quad \text{(Expression 3)}$$

(Production Example 1 of Water-Based Latex Containing Polymer Particles)

A glass reactor equipped with a thermometer, a stirrer, a reflux condenser, a nitrogen current inlet, and addition devices for monomers and an emulsifier was loaded with 180 parts by weight of deionized water, 0.002 parts by weight of disodium ethylenediamine tetra-acetate (EDTA), 0.001 parts by weight of ferrous sulfate heptahydrate, 0.04 parts by weight of sodium formaldehydesulfoxylate (SFS), and 0.5 parts by weight of sodium dodecylbenzenesulfonate (SDS) and the mixture was heated to 50° C. while being stirred in nitrogen current.

Next, a mixture of 52 parts by weight of butyl acrylate (BA), 26 parts by weight of phenoxyethyl acrylate (PEA), 2 parts by weight of allyl methacrylate (ALMA), and 0.02 parts by weight of cumene hydroperoxide (CHP) was continuously dropwise added for 5 hours. Further, together with the addition of the mixture, an aqueous solution with 5% by weight concentration of SDS containing 1 part by weight of SDS was continuously added for same 5 hours. Polymerization was completed by stirring for 1 hour after completion of the mixture addition to obtain a water-based latex (R-1) containing elastic core layer of polymer particles. The volume average particle diameter of the elastic core layer of the polymer particles contained in the obtained water-based latex was 0.10 μm.

Successively, a mixture of 9 parts by weight of BA, 5 parts by weight of PEA, 5 parts by weight of glycidyl methacrylate (GMA), 1 part by weight of ALMA, and 0.01 parts by weight of CHP was continuously added there for 90 minutes. On completion of the addition, 0.01 parts by weight of CHP was added and polymerization was completed by continuously stirring further for 1 hour to obtain a water-based latex (L-1) containing polymer particles. The polymerization conversion ratio of the monomer components was 99.7%. The volume average particle diameter of the polymer particles contained in the obtained water-based latex was 0.11 μm.

(Production Example 2 of Water-Based Latex Containing Polymer Particles)

A glass reactor equipped with a thermometer, a stirrer, a reflux condenser, a nitrogen current inlet, and addition devices for monomers and an emulsifier was loaded with 180 parts by weight of deionized water, 0.002 parts by weight of EDTA, 0.001 parts by weight of ferrous sulfate heptahydrate, 0.04 parts by weight of SFS, and 2 parts by weight of SDS and the mixture was heated to 50° C. while being stirred in nitrogen current.

Next, a mixture of 24 parts by weight of 2-ethylhexylacrylic acid ester (2-EHA), 25 parts by weight of BA, 28 parts by weight of PEA, 3 parts by weight of ALMA, and 0.02 parts by weight of CHP was continuously dropwise added for 5 hours. Further, together with the addition of the mixture, an aqueous solution with 5% by weight concentration of SDS containing 1 part by weight of SDS was continuously added for same 5 hours. Polymerization was completed by stirring for 1 hour after completion of the mixture addition to obtain a water-based latex (R-2) containing an elastic core layer of polymer particles, which core layer contains an acrylic rubber as a main component. The volume average particle diameter of the elastic core layer of the polymer particles contained in the obtained water-based latex was 0.04 μm.

Successively, a mixture of 11 parts by weight of methylmethacrylate (MMA), 2 parts by weight of styrene (St), 6 parts by weight of GMA, 1 part by weight of ALMA, and 0.01 parts by weight of CHP was continuously added there for 90 minutes. On completion of the addition, 0.01 parts by weight of CHP was added and polymerization was completed by continuously stirring further for 1 hour to obtain a water-based latex (L-2) containing polymer particles. The polymerization conversion ratio of the monomer components was 99.3%. The volume average particle diameter of the polymer particles contained in the obtained water-based latex was 0.04 μm.

(Production Example 3 of Water-Based Latex Containing Polymer Particles)

A pressure resistant polymerizing apparatus was loaded with 200 parts by weight of deionized water, 0.03 parts by weight of tripotassium phosphate, 0.25 parts by weight of dihydrogen potassium phosphate, 0.002 parts by weight of EDTA, 0.001 parts by weight of ferrous sulfate heptahydrate, and 1.5 parts by weight of SDS and after sufficient replacement with nitrogen was carried out under continuously stirring to remove oxygen, 100 parts by weight of butadiene (Bd) was added to the system and the mixture was heated to 45° C. Polymerization was initiated by adding 0.015 parts by weight of paramethane hydroperoxide (PHP) and successively 0.04 parts by weight of SFS. After 4 hours from initiating the polymerization, 0.01 parts by weight of PHP, 0.0015 parts by weight of EDTA, and 0.001 parts by weight of ferrous sulfate heptahydrate were added. After 10 hour polymerization, remaining monomers were evaporated and removed under reduced pressure and the polymerization was finished to obtain a water-based latex containing an elastic core layer which contains a polybutadiene rubber as a main component. The volume average particle diameter of the elastic core layer of the polymer particles contained in the obtained water-based latex was 0.10 μm.

A glass reactor equipped with a thermometer, a stirrer, a reflux condenser, a nitrogen current inlet, and addition devices for monomers and an emulsifier was loaded with 246 parts by weight of the water-based latex containing an elastic core layer containing polybutadiene rubber as a main component (equivalent to 80 parts by weight of polybutadiene rubber particles) and 56 parts by weight of deionized water, and the mixture was stirred while replacement with nitrogen being carried out. After 0.002 parts by weight of EDTA, 0.001 parts by weight of ferrous sulfate heptahydrate, and 0.04 parts by weight of SFS were added, a mixture of 9 parts by weight of BA, 5 parts by weight of PEA, 5 parts by weight of GMA, 1 part by weight of ALMA, and 0.01 parts by weight of CHP was continuously added for 90 minutes. On completion of the addition, 0.01 parts by weight of CHP was added and polymerization was completed by continuously stirring further for 1 hour to obtain a water-based latex (L-3) containing polymer particles. The polymerization conversion ratio of the monomer components was 98.9%. The volume average particle diameter of the polymer particles contained in the obtained water-based latex was 0.11 μm.

(Production Example 4 of Water-Based Latex Containing Polymer Particles)

After a mixture of 200 parts by weight of deionized water, 1.0 part by weight of SDS, 1.0 part by weight of dodecylbenzenesulfonic acid, 97.5 parts by weight of hydroxy-terminated polydimethylsiloxane with an average molecular weight of 2000, and 2.5 parts by weight of γ-methacryloyloxypropyldimethoxysilane was stirred for 5 minutes by a homomixer at 10000 rpm, the mixture was passed through a high pressure homogenizer under pressure of 500 bar three times to prepare a siloxane emulsion. The emulsion was quickly and collectively loaded to a glass reactor equipped with a thermometer, a stirrer, a reflux condenser, a nitrogen current inlet, and addition devices for auxiliary raw materials such as monomers and an emulsifier. While the system being stirred, the reaction was started at 30° C. After 6 hours, the system was cooled to 23° C. and left for 20 hours and the pH of the system was turned to be 6.8 by sodium hydrogen carbonate and the polymerization was finished to obtain a water-based latex containing an elastic core layer containing a polyorganosiloxane rubber as a main component. The volume average particle diameter of the polymer particles contained in the obtained water-based latex was 0.28 μm.

A glass reactor equipped with a thermometer, a stirrer, a reflux condenser, a nitrogen current inlet, and addition devices for monomers was loaded with 246 parts by weight of the water-based latex containing an elastic core layer containing a polyorganosiloxane rubber as a main component (equivalent to 80 parts by weight of polyorganosiloxane rubber particles) and 56 parts by weight of deionized water, and the mixture was stirred at 50° C. while replacement with nitrogen being carried out. After 0.002 parts by weight of EDTA, 0.001 parts by weight of ferrous sulfate heptahydrate, and 0.04 parts by weight of SFS were added, a mixture of 9 parts by weight of BA, 5 parts by weight of PEA, 5 parts by weight of GMA, 1 part by weight of ALMA, and 0.01 parts by weight of CHP was continuously added for 90 minutes. On completion of the addition, 0.01 parts by weight of CHP was added and polymerization was completed by continuously stirring further for 1 hour to obtain a water-based latex (L-4) containing polymer particles. The polymerization conversion ratio of the monomer components was 99.4%. The volume average particle diameter of the polymer particles contained in the obtained water-based latex was 0.30 μm.

The monomer compositions of Production Examples 1 to 4 are collectively shown in Table 1.

TABLE 1

| | Production Example 1 | | Production Example 2 | | Production Example 3 | | Production Example 4 | |
|---|---|---|---|---|---|---|---|---|
| | elastic core layer | | | | | | | |
| | acrylic rubber | | acrylic rubber | | polybutadiene rubber | | polyorganosiloxane rubber | |
| | core | shell | core | shell | core | shell | core | shell |
| PEA | 26 | 5 | 28 | 0 | 0 | 5 | 0 | 5 |
| GMA | 0 | 5 | 0 | 6 | 0 | 5 | 0 | 5 |

TABLE 1-continued

|  | Production Example 1 | | Production Example 2 | | Production Example 3 | | Production Example 4 | |
| --- | --- | --- | --- | --- | --- | --- | --- | --- |
|  | elastic core layer | | | | | | | |
|  | acrylic rubber | | acrylic rubber | | polybutadiene rubber | | polyorganosiloxane rubber | |
|  | core | shell | core | shell | core | shell | core | shell |
| ALMA | 2 | 1 | 3 | 1 | 0 | 1 | 0 | 1 |
| BA | 52 | 9 | 25 | 0 | 0 | 9 | 0 | 9 |
| 2-EHA | 0 | 0 | 24 | 0 | 0 | 0 | 0 | 0 |
| MMA | 0 | 0 | 0 | 11 | 0 | 0 | 0 | 0 |
| St | 0 | 0 | 0 | 2 | 0 | 0 | 0 | 0 |
| Bd | 0 | 0 | 0 | 0 | 80 | 0 | 0 | 0 |
| polyorganosiloxane | 0 | 0 | 0 | 0 | 0 | 0 | 80 | 0 |
| refractive index n | 1.499 | 1.504 | 1.499 | 1.507 | 1.515 | 1.504 | 1.407 | 1.504 |
| volume average particle diameter (μm) | 0.11 | | 0.04 | | 0.11 | | 0.30 | |

Example 1

A 1 L mixing tank at 25° C. was loaded with 126 parts by weight of methyl ethyl ketone (MEK), and 126 parts by weight of the water latex of polymer particles obtained in Production Example 1 was added under stirring. After the mixture was mixed uniformly, 200 parts by weight of water (in total 452 parts by weight) was added at a supply speed of 80 parts by weight/min. On completion of the supply, the stirring was quickly stopped to obtain a slurry liquid containing floating agglomerates.

Next, leaving the agglomerates, 350 parts by weight of the liquid phase was discharged through a discharge port in a lower part of the tank. The obtained agglomerates (polymer particle dope) was mixed with 90 parts by weight of MEK additionally added (remaining 192) to obtain an organic solvent solution (organic liquid) in which the polymer particles were dispersed. After 120 parts by weight (in total 312) of a hydrogenated bisphenol A type epoxy resin (jER YX8000, manufactured by Japan Epoxy Resin Inc.) was charged into and then mixed with the organic solvent solution (organic liquid), MEK was removed under reduced pressure to obtain the hydrogenated bisphenol A type epoxy resin in which the polymer particles were dispersed as a cycloaliphatic epoxy resin composition 1. The cycloaliphatic epoxy resin composition 1 was colorless and transparent.

A transparent liquid resin composition was obtained by well mixing 125 g of the cycloaliphatic epoxy resin composition 1 (epoxy equivalent; 257 g/eq), 80 g of methyl hexahydrophthalic anhydride (Rikacid MH-700, manufactured by New Japan Chemical Co., Ltd.: acid anhydride equivalent; 164 g/eq) as a curing agent, and 1 g of tetra-n-butylphosphonium-o,o-diethylphosphorodithionate (Hishicolin PX-4ET, manufactured by Nippon Chemical Industrial Co., Ltd.) as a curing accelerator while keeping the temperature at 70° C. and further defoaming the mixture. The liquid resin composition was poured between two sheets of glass sandwiching a spacer with a thickness of 3 mm and cured at 100° C. for 3 hours in a hot air oven and successively at 140° C. for 3 hours to obtain a colorless and transparent cured plate with a thickness of 3 mm. The physical properties of the cured plate are shown in Table 2.

Example 2

A cycloaliphatic epoxy resin composition 2 in which polymer particles were dispersed was obtained in the same manner as Example 1, except that the water-based latex of the polymer particles obtained by Production Example 2 was used in place of the water-based latex of the polymer particles obtained by Production Example 1 and 3,4-epoxycyclohexylmethyl-3',4'-epoxycyclohexane carboxylate (Celloxide 2021P, manufactured by Daicel Chemical Ind., Ltd.) was used in place of the hydrogenated bisphenol A type epoxy resin. The cycloaliphatic epoxy resin composition 2 was colorless and transparent.

A colorless and transparent cured plate was obtained in the same manner as Example 1, except that 82 g of the cycloaliphatic epoxy resin composition 2 (epoxy equivalent; 168 g/eq) was used in place of 125 g of the cycloaliphatic epoxy resin composition 1. The physical properties of the cured plate are shown in Table 2.

Comparative Example 1

A cycloaliphatic epoxy resin composition 3 in which polymer particles were dispersed was obtained in the same manner as Example 1, except that the water-based latex of the polymer particles obtained by Production Example 3 was used in place of the water-based latex of the polymer particles obtained by Production Example 1. The cycloaliphatic epoxy resin composition 3 was light yellow and translucent.

A light yellow and translucent cured plate was obtained in the same manner as Example 1, except that 125 g of the cycloaliphatic epoxy resin composition 3 (epoxy equivalent; 257 g/eq) was used in place of the cycloaliphatic epoxy resin composition 1. The physical properties of the cured plate are shown in Table 2.

Comparative Example 2

A cycloaliphatic epoxy resin composition 4 in which polymer particles were dispersed was obtained in the same manner as Example 1, except that the water-based latex of the polymer particles obtained by Production Example 4 was used in place of the water-based latex of the polymer particles obtained by Production Example 1. The cycloaliphatic epoxy resin composition 4 was white and translucent.

A white and translucent cured plate was obtained in the same manner as Example 1, except that 125 g of the cycloaliphatic epoxy resin composition 4 (epoxy equivalent; 257 g/eq) was used in place of the cycloaliphatic epoxy resin composition 1. The physical properties of the cured plate are shown in Table 2.

Comparative Example 3

Agglomerates were produced by loading a 1 L mixing tank at 25° C. with 500 parts by weight of the water-based latex of polymer particles obtained in Production Example 2 and 13 parts by weight of a 35% by mass aqueous calcium chloride $CaCl_2$ solution as an agglomeration agent under stirring. The slurry containing the agglomerates was heated to 80° C. and then cooled to room temperature under stirring. The slurry was filtered and dewatered by a filter equipped with a suction bottom and then the agglomerates were dried at 50° C. for 24 hours by using a box type drier to obtain a dried powder of polymer particles. After 25 parts by weight of the dried powder was mixed with 75 parts by weight of "Celloxide 2021P", the mixture was subjected to ultrasonic dispersion (20 kHz) for 1 hour to obtain a cycloaliphatic epoxy resin composition 5 containing the polymer particles. The cycloaliphatic epoxy resin composition 5 was a highly viscous, white and opaque liquid.

A cured plate obtained using 82 g of the cycloaliphatic epoxy resin composition 5 (epoxy equivalent; 168 g/eq) in the same manner as Example 2 was white and opaque.

TABLE 2

|  |  | Example 1 | Example 2 | Comparative Example 1 | Comparative Example 2 | Comparative Example 3 |
|---|---|---|---|---|---|---|
| refractive index | core ($n_C$) | 1.499 | 1.499 | 1.515 | 1.407 | 1.499 |
|  | shell ($n_S$) | 1.504 | 1507 | 1.504 | 1.504 | 1507 |
|  | cured product of alicyclic epoxy resin ($n_E$) | 1.50 | 1.50 | 1.50 | 1.50 | 1.50 |
| transmittance (T %) | 380 nm | 84 | 82 | 67 | 13 | 0 |
|  | 540 nm | 92 | 90 | 84 | 72 | 3 |
|  | 700 nm | 92 | 90 | 89 | 83 | 5 |
| particle dispersion ratio (%) |  | 100 | 96 | 98 | 96 | 21 |

It is understood from Examples 1 and 2 that the polymer particles were evenly dispersed without being agglomerated and transparent cured products of the cycloaliphatic epoxy resin compositions can be obtained since the refractive indexes of the core and the shell were within $n_E \pm 0.01$. Comparison of Examples 1 and 2 with Comparative Examples 1 and 2 makes it clear that if the refractive indexes of both of the core and the shell were not within $n_E \pm 0.01$, sufficiently transparent cured product could be obtained. Further, in the case polymer particles were coagulated to be a dried powder, it is understood that no cycloaliphatic epoxy resin composition in which polymer particles were evenly dispersed could obtained.

Example 3

A cycloaliphatic epoxy resin composition 6 was obtained by adding 425 parts by weight of hydrogenated bisphenol A type epoxy resin (jER YX8000, manufactured by Japan Epoxy Resin Inc.) to 100 parts by weight of the cycloaliphatic epoxy resin composition 1 and mixing them.

A colorless and transparent cured plate with a thickness of 5 mm was obtained by curing in the same manner as Example 1, except that 109 g of the cycloaliphatic epoxy resin composition 6 (epoxy equivalent; 223 g/eq) was used in place of the cycloaliphatic epoxy resin composition 1 and a spacer with a thickness of 5 mm was used in place of the spacer with a thickness of 3 mm. The rupture toughness value of the cured plate was 1.00 MPa·m$^{1/2}$.

Comparative Example 4

A colorless and transparent cured plate with a thickness of 5 mm was obtained by curing in the same manner as Example 1, except that 100 g of hydrogenated bisphenol A type epoxy resin (jER YX8000, manufactured by Japan Epoxy Resin Inc.) was used in place of the cycloaliphatic epoxy resin composition 1 and a spacer with a thickness of 5 mm was used in place of the spacer with a thickness of 3 mm. The rupture toughness value of the cured plate was 0.49 MPa·m$^{1/2}$.

Comparison of Example 3 and Comparative Example 4 makes it clear that the rupture toughness improvement effect was caused.

Next, with respect to glutarimido acrylic resin compositions, which were rubbery polymer-containing resin compositions of the invention, the invention will be described in more detail with reference to Examples and Comparative Examples.

Calculation of the imidization ratio was carried out as using IR as follows. That is, pellets of each product were dissolved in methylene chloride and the obtained solution was subjected to IR spectrum measurement at room temperature using Travel IR manufactured by SensIR Technologies. The imidization ratio (Im % (IR)) was obtained from the ratio of the absorption intensity ($Abs_{ester}$) due to an ester carbonyl group at 1720 cm$^{-1}$ and the absorption intensity ($Abs_{imide}$) due to an imido carbonyl group at 1660 cm$^{-1}$ in the obtained IR spectrum. Herein, "imidization ratio" means the ratio of the imido carbonyl group in the total carbonyl group.

The glass transition temperature was measured at the increasing speed of temperature 20° C./min under nitrogen atmosphere by using a differential scanning calorimeter DSC-50 model manufactured by Shimadzu Corporation.

The refractive index was measured by processing each composition into a sheet and using a precision Abbe refractometer manufactured by Atago Co., Ltd.

(Processing Method and Measurement Method for Film)

The haze and total luminous transmittance of each film were measured according to a method described in JIS K7105 by using NDH-300A manufactured by Nippon Denshoku Industries Co., Ltd.

Stretching of each film was carried out at 140° C. using a biaxially stretching apparatus SS-70 manufactured by Shibayama Co., Ltd.

The bending resistance of each film was tested according to a method described in JIS C5016 by using a MIT bending resistance fatigue tester manufactured by Toyo Seiki Seisakusho Ltd. The measurement condition was R=0.38 and load 100 g.

(Synthesis of Glutarimido Acrylic Resin (A-1))

An imidized resin was produced by methyl methacrylate-styrene copolymer (styrene ratio 11 mol %) as a raw material resin and monomethylamine as an imidization agent.

An extruder used was an intermeshing and parallel rotation type twin-screw extruder with an aperture diameter of 15 mm. The setting temperature in the respective temperature adjustment zones of the extruder was set to be 230° C. and the screw rotation speed was set to be 150 rpm. After the methyl methacrylate-styrene copolymer (hereinafter, referred to also as MS resin) was supplied at 2 kg/hr and the resin was melted and packed by a kneading block, 25 parts by weight of monomethylamine (manufactured by Mitsubishi Gas Chem. Co., Inc.) was injected to the resin by a nozzle. A reverse flight was put in the terminal of the reaction zone to fill the zone with the resin. Byproducts and excess methylamine after reaction were removed by reducing the pressure at a vent port to −0.092 MPa. The resin out of a dice installed in the outlet of the extruder in form of strands was cooled in a water tank and thereafter pelletized by a pelletizer to obtain imidized MS resin (1).

Next, in the intermeshing and parallel rotation type twin-screw extruder with an aperture diameter of 15 mm, the setting temperature in the respective temperature adjustment zones of the extruder was set to be 230° C. and the screw rotation speed was set to be 150 rpm. The obtained imidized MS resin (1) was supplied at 1 kg/hr from a hopper and the resin was melted by a kneading block and packed and thereafter, a mixed liquid of 8 parts by weight of dimethyl carbonate and 2 parts by weight of triethylamine was injected to the resin from a nozzle to decrease carboxyl groups in the resin. A reverse flight was put in the terminal of the reaction zone to fill the zone with the resin. Byproducts and excess methylamine after reaction were removed by reducing the pressure at a vent port to −0.092 MPa. The resin out of a dice installed in the outlet of the extruder in form of strands was cooled in a water tank and thereafter pelletized by a pelletizer to obtain imidized MS resin (2) that the acid number is reduced.

Further, the imidized MS resin (2) was loaded to the intermeshing and parallel rotation type twin-screw extruder with an aperture diameter of 15 mm in conditions that the setting temperature in the respective temperature adjustment zones of the extruder was set to be 230° C.; the screw rotation speed was set to be 150 rpm; and the supply amount was 1 kg/hr. Volatile contents such as unreacted auxiliary raw materials were again removed by reducing the pressure at a vent port to −0.095 MPa. The resin obtained by removing the volatile contents out of a dice installed in the outlet of the extruder in form of strands was cooled in a water tank and thereafter pelletized by a pelletizer to obtain a glutarimido acrylic resin A-1.

The glutarimido acrylic resin A-1 corresponds to the glutarimido acrylic resin obtained by copolymerizing the glutarimide unit defined by the general formula (1) described in the embodiments, (meth)acrylic acid ester unit defined by the general formula (2), and an aromatic vinyl unit defined by the general formula (3).

With respect to the glutarimido acrylic resin A-1, the imidization ratio, glass transition temperature, and refractive index were measured according to the above-mentioned methods. As a result, the imidization ratio was 70 mol %, glass transition temperature was 140° C., and the refractive index was 1.53.

(Synthesis of Graft Copolymer B-1)

A reactor was loaded with 182 parts by weight of ion-exchanged water and 0.045 parts by weight of sodium dodecylbenzenesulfonate and the mixture was heated to 50° C. while being stirred in nitrogen current. Successively, 20% of a mixed liquid containing 49 parts by weight of 2-phenoxyethyl acrylate, 21 parts by weight of butyl acrylate, 1.05 parts by weight of allyl methacrylate, and 0.025 parts by weight of tert-butyl hydroperoxide was collectively added and the mixture was stirred for 10 minutes. Thereafter, 0.32 parts by weight of sodium formaldehyde sulfoxylate, 0.006 parts by weight of sodium ethylenediamine tetra-acetate, and 0.002 parts by weight of ferrous sulfate heptahydrate were added and the resulting mixture was stirred for 30 minutes. Next, 0.15 parts by weight of sodium lauryl sulfate was added and stirred for 10 minutes and thereafter, the remaining 80% of the mixed liquid was continuously added for 3 hours. On completion of the addition, the temperature was kept for 30 minutes at the same temperature to complete polymerization. The average particle diameter in the obtained crosslinked polymer latex was 212 nm and the polymerization conversion ratio was 98%.

While being stirred in nitrogen current, the obtained crosslinked polymer latex was kept at 50° C. and mixed with 0.15 parts by weight of sodium lauryl sulfate and stirred for 10 minutes, and thereafter a mixed liquid containing 3 parts by weight of butyl acrylate, 13.4 parts by weight of methyl methacrylate, 13.7 parts by weight of styrene, and 0.15 parts by weight of tert-butyl hydroperoxide was continuously added for 75 minutes. On completion of the addition, the reaction system was stirred for 75 minutes at the same temperature and polymerization was completed to obtain a graft copolymer latex. The graft copolymer latex was subjected to salting out coagulation, heat treatment, and drying by conventionally known methods to obtain a graft copolymer B-1, a white powder-like core-shell polymer composition of the invention. The obtained graft copolymer had a glass transition temperature of −32° C. and a refractive index of 1.53.

(Synthesis of Graft Copolymers (B-2, B-3, and B-4))

Graft copolymers B-2, B-3, and B-4, core-shell polymer compositions of the invention, were obtained in the same synthesis method as that of graft copolymer B-1, except that the amount of sodium dodecylbenzenesulfonate was changed to 0.200 parts by weight, 0.010 parts by weight, and 0.005 parts by weight, respectively. The average particle diameters in the crosslinked polymer latex at the time of polymerization were 146 nm, 272 nm, and 305 nm, respectively. The glass transition temperatures of the obtained graft polymers were all −32° C. and the refractive indexes were all 1.53.

(Synthesis of Graft Copolymer (B-5))

A white powder-like graft copolymer B-5, a core-shell polymer composition of the invention, was obtained in the same synthesis method as that of graft copolymer B-1, except that the composition of the mixed liquid to be added continuously to the crosslinked polymer latex was changed to be a mixture of 6.9 parts by weight of methyl methacrylate, 6.6 parts by weight of styrene, 3.6 parts by weight of acrylonitrile, and 0.075 parts by weight of tert-butyl hydroperoxide in the first step and 6.9 parts by weight of methyl methacrylate and 6 parts by weight of styrene in the second step and the additional times in the first step and the second step were changed to be 42 minutes and 33 minutes (in total 75 minutes). The glass transition temperature of the obtained graft polymer was −32° C. and the refractive index was 1.53.

(Synthesis of Graft Copolymer (B-6))

A graft copolymer B-6, a core-shell polymer composition to be used as Comparative Example, was obtained by carrying out the same process and the same synthesis method as that of graft copolymer B-1, except that 70 parts by weight of n-butyl acrylate was used in place of 49 parts by weight of 2-phenoxyethyl acrylate and 21 parts by weight of butyl acrylate. The glass transition temperature of the obtained graft polymer was −54° C. and the refractive index was 1.46.

(Synthesis of Graft Copolymer (B-7))

A graft copolymer B-7, a core-shell polymer composition to be used as Comparative Example, was obtained by carrying out the same process and the same synthesis method as that of graft copolymer B-1, except that 51 parts by weight of styrene and 49 parts by weight of n-butyl acrylate were used in place of 49 parts by weight of 2-phenoxyethyl acrylate and 21 parts by weight of butyl acrylate. The glass transition temperature of the obtained graft polymer was 17° C. and the refractive index was 1.53.

Examples 4 to 11 and Comparative Examples 5 to 7

Using an intermeshing and parallel rotation type twin-screw extruder with an aperture diameter of 30 mm and setting the temperature adjustment zone of the extruder to be 240° C. and the screw rotation speed to be 250 rpm, a mixture of glutarimido acrylic resin (A-1) and a graft copolymer was supplied at a ratio of 10 kg/hr. The resin out of a dice installed in the outlet of the extruder in form of strands was cooled in a water tank and thereafter pelletized by a pelletizer.

Using a melt extruder connected with a T die at the outlet and setting the temperature adjustment zone of the extruder to be 280° C. and the screw rotation speed to be 100 rpm, the obtained pellets were supplied at a resin pellet supply amount of 10 kg/hr and melt-extruded to obtain a film with a thickness of about 130 μm.

The film was biaxially stretched at 145° C. to obtain a stretched film.

The blending ratios of the respective components for respective Examples and Comparative Examples, and haze values and total luminous transmittances of obtained films as well as bending resistance property of the stretched films are show in Table 3. The blending amount of (B) in Table 3 is the blending amount of (B) to 100 parts by weight of (A).

[6] Measurement of Total Luminous Transmittance and Haze

The optical transmittance was measured according to JISK7105.

(Production of Graft Copolymer C-1)

A reactor was loaded with 182 parts by weight of ion-exchanged water and 0.05 parts by weight of sodium dodecylbenzenesulfonate and the mixture was heated to 50° C. while being stirred in nitrogen current. Successively, 20% of a mixed liquid containing 49 parts by weight of 2-phenoxyethyl acrylate, 21 parts by weight of butyl acrylate, 1.05 parts by weight of allyl methacrylate, and 0.025 parts by weight of tert-butyl hydroperoxide was collectively added and the mixture was stirred for 10 minutes. Thereafter, 0.32 parts by weight of sodium formaldehyde sulfoxylate, 0.006 parts by weight of sodium ethylenediamine tetra-acetate, and 0.002 parts by weight of ferrous sulfate heptahydrate were added and the resulting mixture was stirred for 30 minutes. Next, 0.15 parts by weight of sodium lauryl sulfate was added and stirred for 10 minutes and thereafter, the remaining 80% of the mixed liquid was continuously added for 3 hours. On completion of the addition, the temperature was kept same for 30 minutes to complete polymerization. The average particle diameter in the obtained crosslinked polymer latex was 212 nm and the polymerization conversion ratio was 98%.

While being stirred in nitrogen current, the obtained crosslinked polymer latex was kept at 50° C., mixed with 0.15 parts by weight of sodium lauryl sulfate and stirred for 10 minutes, and thereafter a mixed liquid containing 3 parts by weight of butyl acrylate, 13.4 parts by weight of methyl

TABLE 3

| | graft copolymer (B) | | amount of (B) | melt extrusion film | | | biaxially stretched film | |
| --- | --- | --- | --- | --- | --- | --- | --- | --- |
| | | | | thickness | total luminous transmittance | haze | thickness | MIT |
| | number | transmittance | (parts by weight) | (μm) | (%) | (%) | (μm) | strength |
| Example 4 | B-1 | 1.53 | 5 | 131 | 92 | 0.9 | 41 | 837 |
| Example 5 | B-1 | 1.53 | 10 | 128 | 92 | 2.6 | 38 | 822 |
| Example 6 | B-2 | 1.53 | 10 | 138 | 92 | 3.0 | 39 | 735 |
| Example 7 | B-3 | 1.53 | 10 | 140 | 92 | 2.0 | 39 | 831 |
| Example 8 | B-4 | 1.53 | 10 | 128 | 92 | 1.8 | 39 | 890 |
| Example 9 | B-5 | 1.53 | 5 | 130 | 92 | 0.5 | 40 | 929 |
| Example 10 | B-5 | 1.53 | 10 | 120 | 92 | 0.6 | 39 | 1345 |
| Example 11 | B-5 | 1.53 | 15 | 130 | 92 | 0.7 | 40 | 1521 |
| Comparative Example 5 | B-6 | 1.46 | 10 | 122 | 89 | 22.3 | 40 | 901 |
| Comparative Example 6 | B-7 | 1.53 | 10 | 130 | 92 | 2.0 | 40 | 660 |
| Comparative Example 7 | — | — | — | 131 | 92 | 0.3 | 40 | 684 |

As being observed, addition of the graft copolymer components, which were core-shell polymer compositions of the invention, with refractive indexes close to that of the acrylic resin and low glass transition temperatures to the acrylic type resins with a glass transition temperature of 120° C. or higher made it possible to obtain resin compositions with excellent bending resistance, which is a mechanical property.

Next, with respect to a vinyl chloride resin composition, which is a rubbery polymer-containing resin composition of the invention, will be described in more detail with reference to Examples and Comparative Examples.

(Evaluation Methods)

[5] Measurement of Izod Impact Strength

The Izod impact strength was measured according to JISK7110.

methacrylate, 13.7 parts by weight of styrene, and 0.15 parts by weight of tert-butyl hydroperoxide was continuously added for 75 minutes. On completion of the addition, the reaction system was stirred for 75 minutes at the same temperature and polymerization was completed to obtain a graft copolymer latex. The graft copolymer latex was subjected to salting out coagulation, heat treatment, and drying by conventionally known methods to obtain a graft copolymer C-1, a white powder-like core-shell polymer composition of the invention. The obtained graft copolymer had a glass transition temperature of −32° C. and a refractive index of 1.53.

(Production of Graft Copolymer C-2)

A graft copolymer C-2, a core-shell polymer composition to be used as Comparative Example, was obtained by carrying out the same process and the same synthesis method as that of graft copolymer C-1, except that 70 parts by weight of butyl acrylate was used in place of 49 parts by weight of 2-phenoxyethyl acrylate and 21 parts by weight of butyl acrylate. The glass transition temperature of the obtained graft polymer was −54° C. and the refractive index was 1.46.

Example 12

A vinyl chloride type resin composition (D-1) was obtained by blending 7 parts by weight of the obtained graft copolymer (C-1), 100 parts by weight of a vinyl chloride resin (average polymerization degree: 700), 1 part by weight of mercapto octyltin (TVS #8831), 0.8 parts by weight of a polyol ester (Loxiol GH4), and 0.2 parts by weight of a fatty acid ester (H-Wax. E).

The vinyl chloride type resin composition (D-1) was kneaded with rolls at 160° C. for 5 minutes and pressure-molded for 15 minutes by a heat press at 180° C. to obtain a piece for Izod impact resistance test with a thickness of 5 mm and a transparent plate with a thickness of 5 mm. The physical property values of the piece for Izod impact resistance test and the transparent plate are shown in Table 4.

Comparative Example 8

A vinyl chloride type resin composition (D-2) and a piece for Izod impact resistance test with a thickness of 5 mm and a transparent plate with a thickness of 5 mm were obtained in the same manner as Example 1, except that the graft copolymer (C-2) was used in place of the graft copolymer (C-1). The physical property values of the piece for Izod impact resistance test and the transparent plate are shown in Table 4.

TABLE 4

| | Izod impact strength (23° C.) (kJ/m$^2$) | haze (%) | total luminous transmittance (%) |
|---|---|---|---|
| Example 12 | 11.5 | 14.46 | 79.31 |
| Comparative Example 8 | 12.0 | 99.27 | 19.73 |

Comparison of Example 12 and Comparative Example 8 makes it clear that the haze and total luminous transmittance were improved while the Izod impact strength was kept approximately the same.

INDUSTRIAL APPLICABILITY

Since a cycloaliphatic epoxy resin composition (a cured product) of the invention, which is a representative rubbery polymer-containing resin composition of the invention, is excellent in transparency and light stability, the resin composition can be used preferably for sealing materials for optical semiconductor devices represented by light-emitting devices such as electroluminescent diodes (LED), light-receiving devices such as photodiodes, and photoelectric conversion devices such as CCD.

The invention claimed is:

1. A resin composition comprising a resin and polymer particles,
wherein,
the resin is a cycloaliphatic epoxy resin,
the polymer particles have a core-shell structure containing at least two layers consisting of an elastic core layer made of a rubbery polymer, which elastic core layer is present in the inner side thereof, and a shell layer made of a hard polymer, which shell layer is present in the outermost side thereof,
the polymer particles are obtained by polymerizing 5 to 100 parts by weight of hard polymer-constituting components in the presence of 100 parts by weight of the rubbery polymer to form the hard polymer having a glass transition temperature of higher than 0° C. on the rubbery polymer,
the rubbery polymer has a glass transition temperature of 0° C. or lower and is obtained by polymerizing rubbery polymer-constituting components consisting of 20% to 100% by weight of a (meth)acrylic acid ester having a phenoxy group, 0% to 80% by weight of an alkyl acrylic acid ester having an alkyl group of 2 to 18 carbon atoms, and 0% to 30% by weight of a monomer copolymerizable with these esters,
the polymer particles have a volume average particle diameter (Mv) of not smaller than 0.01 μm and not larger than 0.5 μm, and
the resin composition comprises 100 parts by weight of the cycloaliphatic epoxy resin and 1 to 60 parts by weight of the polymer particles.

2. The resin composition according to claim 1, wherein the rubbery polymer is a crosslinked rubbery polymer obtained by polymerizing rubbery polymer-constituting components consisting of 20% to 99.95% by weight of a (meth)acrylic acid ester having a phenoxy group, 0% to 79.95% by weight of an alkyl acrylic acid ester having an alkyl group of 2 to 18 carbon atoms, 0.05% to 10% by weight of a polyfunctional monomer, and 0% to 20% by weight of a monomer copolymerizable with these esters and/or this monomer.

3. The resin composition according to claim 1,
wherein the shell layer in the outermost layer is obtained by polymerizing 0% to 43% by mass of a (meth)acrylic acid ester having at least one aromatic ring in the molecule thereof, 15% to 58% by mass of a (meth)acrylic acid ester having at least one cyclic ether structure in the molecule thereof, 2% to 15% by mass of a polyfunctional monomer, 0% to 83% by mass of another (meth) acrylic acid ester, and 0% to 43% by mass of another vinyl monomer in an amount of 100% by mass in total.

4. The resin composition according to claim 1,
wherein the polymer particle is dispersed in state of primary particles in the cycloaliphatic epoxy resin.

5. A cured product obtained by curing the resin composition according to claim 1,
wherein the cured product with a thickness of 3 mm has an optical transmittance of 80% or higher in a wavelength range of 380 to 800 nm.

6. The cured product according to claim 5, wherein the cured product is obtained by curing with an acid anhydride curing agent or a cationic polymerization initiator.

7. A process for producing a resin composition according to claim 1,
wherein the resin composition is prepared by steps including successively:
a first step of mixing a water-based latex containing polymer particles with an organic solvent with a solubility of not lower than 5% by mass and not higher than 40% by mass in water at 20° C., and then further mixing with not less than 40 parts by weight and not more than 300 parts by weight of water relative to 100 parts by weight of the organic solvent to agglomerate the polymer particles;
a second step of separating and recovering the agglomerated polymer particles from the liquid phase, and then mixing the polymer particles with an organic solvent again to obtain an organic liquid containing the polymer particles; and a third step of further mixing the organic liquid with a cycloaliphatic epoxy resin and removing the organic solvent therefrom.

8. The process for producing a resin composition according to claim 7, wherein an operation of separating and recovering the agglomerated polymer particles from the liquid phase, mixing them with an organic solvent with a solubility of not lower than 5% by mass and not higher than 40% by mass in water at 20° C., and then further mixing with not less than 40 parts by weight and not more than 300 parts by weight of water relative to 100 parts by weight of the organic solvent to agglomerate the polymer particles is carried out one or more times between the first step and the second step.

* * * * *